(12) United States Patent
Madisetti et al.

(10) Patent No.: US 10,102,526 B1
(45) Date of Patent: Oct. 16, 2018

(54) METHOD AND SYSTEM FOR BLOCKCHAIN-BASED COMBINED IDENTITY, OWNERSHIP, INTEGRITY AND CUSTODY MANAGEMENT

(71) Applicants: Vijay K. Madisetti, Johns Creek, GA (US); Arshdeep Bahga, Chandigarh (IN)

(72) Inventors: Vijay K. Madisetti, Johns Creek, GA (US); Arshdeep Bahga, Chandigarh (IN)

(*) Notice: Subject to any disclaimer, the term of this patent is extended or adjusted under 35 U.S.C. 154(b) by 0 days.

(21) Appl. No.: 15/863,128

(22) Filed: Jan. 5, 2018

Related U.S. Application Data

(60) Provisional application No. 62/582,422, filed on Nov. 7, 2017, provisional application No. 62/479,966, filed on Mar. 31, 2017.

(51) Int. Cl.
| | |
|---|---|
| *G06Q 20/38* | (2012.01) |
| *H04L 9/32* | (2006.01) |
| *H04L 9/06* | (2006.01) |
| *H04L 9/14* | (2006.01) |
| *G06Q 20/36* | (2012.01) |
| *G06Q 20/06* | (2012.01) |
| *H04L 9/30* | (2006.01) |

(52) U.S. Cl.
CPC ..... *G06Q 20/38215* (2013.01); *G06Q 20/065* (2013.01); *G06Q 20/367* (2013.01); *H04L 9/0637* (2013.01); *H04L 9/14* (2013.01); *H04L 9/30* (2013.01); *H04L 9/3242* (2013.01); *H04L 9/3247* (2013.01); *H04L 9/3263* (2013.01); *H04L 2209/56* (2013.01)

(58) Field of Classification Search
None
See application file for complete search history.

(56) References Cited

U.S. PATENT DOCUMENTS

| | | | |
|---|---|---|---|
| 9,935,772 B1 * | 4/2018 | Madisetti | H04L 9/3226 |
| 2006/0100888 A1 * | 5/2006 | Kim | G06Q 20/3674 |
| | | | 705/67 |
| 2006/0161781 A1 * | 7/2006 | Rice | G06F 21/645 |
| | | | 713/176 |
| 2015/0134561 A1 * | 5/2015 | Ashley | H04W 4/80 |
| | | | 705/342 |
| 2016/0301531 A1 * | 10/2016 | Finlow-Bates | G06F 21/33 |

(Continued)

*Primary Examiner* — Michael R Vaughan
(74) *Attorney, Agent, or Firm* — Daniel C. Pierron; Widerman Malek PL

(57) ABSTRACT

A method of issuing blockchain-based digital certificates comprising receiving from a user hashed user identification information and object information, recording to a digital certificate smart contract deployed at a digital certificate smart contract address on a blockchain network the hashed user identification information and object information and a timestamp of when the hashed user identification information and the object information were received, defined as a received timestamp, signing the digital certificate smart contract with an issuer signature, performing a user identity verification process to confirm a user identity, upon confirming the user identity, generating a combination certificate configured to be shared by the user to verify the user's ownership of an object associated with the object information, and sending the combination certificate to the user.

19 Claims, 22 Drawing Sheets

(56) References Cited

U.S. PATENT DOCUMENTS

| | | | |
|---|---|---|---|
| 2017/0098291 A1* | 4/2017 | Code | G06Q 50/188 |
| 2017/0186057 A1* | 6/2017 | Metnick | G06Q 30/0601 |
| 2018/0006826 A1* | 1/2018 | Smith | H04L 9/3263 |
| 2018/0041345 A1* | 2/2018 | Maim | H04L 9/3265 |
| 2018/0075453 A1* | 3/2018 | Durvasula | G06Q 20/4016 |

* cited by examiner

```
contract Seal {
        address public owner;
        uint public hashedData;

function Seal(uint _hashedData) {
                owner = msg.sender;
                hashedData = _hashedData;
        }
}
```
350

```
contract Certification {
        address public owner;
        address public sealedUserRecordAddress;
        address public sealedVerificationRecordAddress;
        uint public token;
        uint public tokenExpires;

function Certification(address _sealedUserRecordAddress,
                address _sealedVerificationRecordAddress,
                        uint _token, uint _tokenExpires) {
                owner = msg.sender;
                sealedUserRecordAddress = _sealedUserRecordAddress;
                sealedVerificationRecordAddress = _sealedVerificationRecordAddress;
                token = _token;
                tokenExpires = _tokenExpires;
        }
}
```
352

FIG. 4

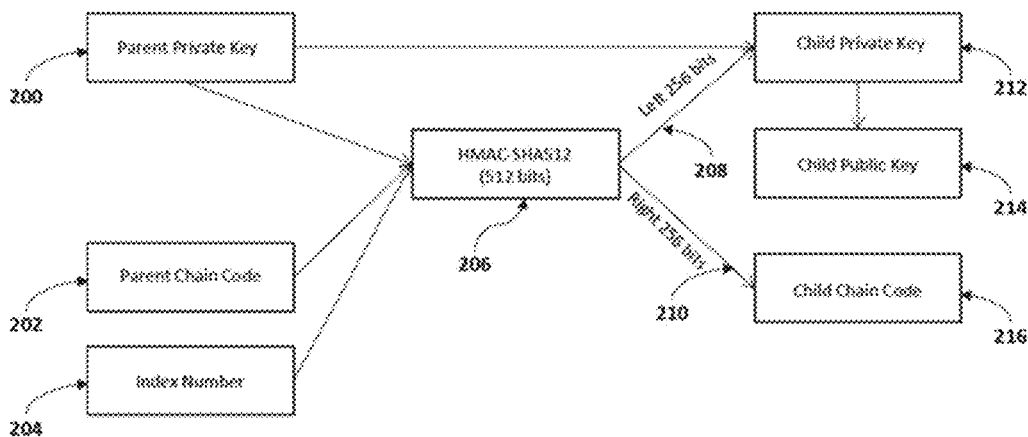

FIG. 5

METHOD AND SYSTEM FOR BLOCKCHAIN-BASED COMBINED IDENTITY, OWNERSHIP, INTEGRITY AND CUSTODY MANAGEMENT

RELATED APPLICATIONS

This application claims the benefit under 35 U.S.C. § 119(e) of U.S. Provisional Patent Application Ser. No. 62/479,966 filed on Mar. 31, 2017 and titled Method and System for Identity and Access Management for Blockchain Interoperability, and U.S. Provisional Patent Application Ser. No. 62/582,422 filed on Nov. 7, 2017 and titled Method And System For Blockchain-based Combined Identity, Ownership, Integrity And Custody Management, the entire contents of which are incorporated herein by reference.

FIELD OF THE INVENTION

The present invention relates to blockchain-based combined identity, ownership, integrity and custody management.

BACKGROUND

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

Existing Blockchain platforms lack identity management beyond the blockchain accounts and there is no way to know if two blockchain accounts belong to the same person. Blockchain applications can be prone to Sybil attacks where the attacker can create a large number of pseudonymous identities and then use them to gain a large influence on the network. In existing Blockchain platforms, there is no way to securely link a blockchain account to a real-user. Prior art linking blockchain accounts to real users is based on know your customer (KYC) processes that require the user to provide KYC documents such as a government issued identity card (such as passport or driving license). The KYC processes require manual verification by the platform or application team. When using multiple private and/or permissioned blockchain networks within a single organization, there is no way for a user to work on multiple blockchain networks while maintaining the same identity. For multiple blockchain networks within an organization or different applications deployed on the same blockchain network, existing solutions require the KYC process to be completed separately either for each blockchain network or for each application.

Existing Proof-of-Existence approaches based on the blockchain technology allow generating ownership certificates for digital objects. An ownership certificate includes an object identifier (such as a cryptographic hash generated from the object contents), owner name, time stamp of generation of the certificate and other related information. In Proof-of-Existence platforms, there is no way to securely link the ownership of a digital object to a verified user, prevent user from using pseudonymous identities or determine a timeline of ownership and custody of digital objects.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are related to a method of issuing blockchain-based digital certificates comprising receiving from a user hashed user identification information and object information recording to a digital certificate smart contract deployed at a digital certificate smart contract address on a blockchain network the hashed user identification information and object information and a timestamp of when the hashed user identification information and the object information were received, defined as a received timestamp, signing the digital certificate smart contract with an issuer signature, and performing a user identity verification process to confirm a user identity. Upon confirming the user identity, the method may further comprise generating a combination certificate configured to be shared by the user to verify the user's ownership of an object associated with the object information and sending the combination certificate to the user.

In some embodiments, the object information may be derived from a digital object comprising content; and wherein the object information comprises a unique identifier generated by applying a cryptographic hash function to the content of the digital object. The object information may alternatively be derived from a physical object comprising an object identifier; and wherein the object information comprise a unique identifier generated by applying a cryptographic hash to the object identifier of the physical object.

In some embodiments the method may further comprise receiving an combination certificate from a consumer, defining a received combination certificate, performing an combination certificate verification process on the received ownership certification to verify the received combination certificate and upon verifying the received combination certificate, sending a confirmation verification response to the consumer. The method may further comprise generating a combination certificate hash value by applying a hash function to the received combination certificate and recording the combination certificate hash value to the digital certificate smart contract. The combination certificate verification process may comprise identifying a signature of the received combination certificate, obtaining a received digital certificate smart contract address from the received combination certificate, generating a query hash value by applying a hash function to the received combination certificate, looking up the combination certificate on the digital certificate smart contract at the digital certificate smart contract address, verifying the query hash value matches an combination certificate hash value comprised by the digital certificate smart contract, verifying the signature of the combination certificate matches the issuer signature of the digital certificate smart contract, and verifying the combination certificate is valid and active.

In some embodiments, the method may further comprise receiving from the user a digital certificate smart contract address, hashed user identification information signed by a private key of the user, and hashed object information, obtaining a user certification record address from a digital certificate smart contract at the digital certificate smart contract address, obtaining a sealed user record address, a sealed verification record address, and a token from a user certification record at the user certification record address, retrieving hashed user identification information, defined as retrieved user identification information, from a sealed user record at the sealed user record address, and decrypting the received user identification information using the user's public key, defining decrypted user identification information. The decrypted user identification information with the retrieved user identification information may be compared. The method may further comprise retrieving a hashed verification record from a sealed verification record at the sealed verification record address, determining if the token from the user certification record address is valid, generating a generated verification record comprising the retrieved user identification information and the token; generating a hashed generated verification record by applying a hash function to the generated verification record, and comparing the hashed generated verification record to the hashed verification record. The method may further comprise retrieving object information, defining retrieved object information, from the digital certificate at the digital certificate address, comparing the retrieved object information with the hashed object information, and retrieving from the digital certificate smart contract a timestamp, defining a retrieved timestamp. Upon determining the decrypted user identification information with the retrieved user identification information are at least a partial match, the hashed generated verification record to the hashed verification record are at least a partial match, and the retrieved object information and the hashed object information are at least a partial match, the method may further comprise sending to the user the retrieved user identification information, the retrieved object information, and the retrieved timestamp.

In some embodiments, performing the user validation process may comprise receiving from the user a user certification record address, hashed user identification information that has been signed with a private key of the user defined as received user identification information, hashed object information defined as received object information, and a user public key, obtaining each of a sealed user record address, a sealed verification record address, and a token from a user certification record address at the user certification record address, retrieving hashed user identification information from a sealed user record at the sealed user record address, defining retrieved user identification information, decrypting the received user identification information using the user public key, defining decrypted user identification information, and comparing the decrypted user identification information with the retrieved user identification information. Performing the user validation process may further comprise retrieving a hashed verification record from a sealed verification record at the sealed verification record address, defining a retrieved verification record, and determining if the token from the user certification record address is valid. Upon determining the token from the user certification record address is valid, performing the user validation process may further comprise generating a generated verification record comprising the retrieved user identification information and the token, generating a hashed verification record by applying a hash function to the generated verification record, comparing the hashed verification record with the retrieved verification record, and confirming the user identity by determining the decrypted user identification information and the retrieved user identification information are at least a partial match and the hashed verification record and the retrieved verification record are at least a partial match.

In some embodiments, generating the combination certificate may comprise generating a combination certificate comprising the user's certification record address, the received object information, and the received timestamp, generating a combination certificate hash value from a hash function including the combination certificate as an input, encrypting the combination certificate hash value with an issuer private key, defining an issuer signature, signing the combination certificate with the issuer signature, defining a signed combination certificate, and recording the signed combination certificate to the digital certificate smart contract.

In some embodiments, the method may further comprise receiving hashed second user identification information associated with a second user and a derivative of the object information, defining a derivative object information, recording to a second digital certificate smart contract deployed at a second digital certificate smart contract address on a second blockchain network the hashed second user identification information and the derivative object information and a timestamp of when the hashed second user identification information and the derivative object information were received, defined as a received timestamp, signing the second digital certificate smart contract with a second issuer signature, generating a second combination certificate configured to be shared by the second user to verify the second user's ownership of a derivative object associated with the derivative object information, and sending the second combination certificate to the second user. Furthermore, the object information may be derived from a digital object comprising content, and the derivative object may be a digital object comprising a subset of the content of the digital object from which the digital object is derived. The derivative object information may comprise a unique identifier generated by applying a cryptographic hash function to the derivative object.

In some embodiments, the method may further comprise receiving hashed third user identification information associated with a third user and the derivative object information, recording to a third digital certificate smart contract deployed at a third digital certificate smart contract address on a third blockchain network the hashed third user identification information and the derivative object information and a timestamp of when the hashed third user identification information and the derivative object information were received, defined as a received timestamp, signing the third digital certificate smart contract with a third issuer signature, generating a third combination certificate configured to be shared by the third user to verify the third user's ownership of a derivative object associated with the derivative object information, sending the third combination certificate to the third user, and recording to the second digital certificate smart contract an indication that the second digital certificate smart contract is expired.

In some embodiments, the method may further comprise receiving hashed third user identification information associated with a third user and a second derivative of the object information, defining a second derivative object information, recording to a third digital certificate smart contract deployed at a third digital certificate smart contract address on a third blockchain network the hashed third user identification information and the second derivative object information and a timestamp of when the hashed third user identification information and the second derivative object information were received, defined as a received timestamp, signing the third digital certificate smart contract with a third issuer signature, generating a third combination certificate configured to be shared by the third user to verify the third user's ownership of a derivative object associated with the second derivative object information, and sending the third combination certificate to the third user. The second derivative object information may exist concurrently with the derivative object information.

The method may further comprise generating a secondary combination certificate configured to be shared by the user to verify the user's ownership of a subset of information object associated with the object information and sending the secondary combination certificate to a second user. Furthermore, the method may additionally comprise receiving a secondary combination certificate from a consumer, defining a received combination certificate, and performing a combination certificate verification process on the received ownership certification to verify the received combination certificate. Upon verifying the received combination certificate, the message may further comprise sending a confirmation verification response to the consumer and sending a subset of information comprised by the object information to the consumer.

In some embodiments the method may further comprising recording to the digital certificate smart contract a location of the user when the user identification information and the object information were received. In some embodiments, the blockchain network may support at least one decentralized consensus protocols of proof-of-work proof-of-stake, proof-of-activity, proof-of-burn, proof-of-capacity, and proof-of-elapsed time.

Additionally, embodiments of the invention may be directed to a method of issuing blockchain-based digital certificates comprising receiving from a user a user certification record address, hashed user identification information that has been signed with a private key of the user defined as received user identification information, hashed object information defined as received object information, and a user public key, recording to a digital certificate smart contract deployed at a digital certificate smart contract address on a blockchain network the received user identification information and the received object information and a timestamp of when the received user identification information and the received object information were received, defined as a received timestamp, and signing the digital certificate smart contract with an issuer signature. The method may further comprise performing a user validation process comprising obtaining each of a sealed user record address, a sealed verification record address, and a token from a user certification record address at the user certification record address, retrieving hashed user identification information from a sealed user record at the sealed user record address, defining retrieved user identification information, decrypting the received user identification information using the user public key, defining decrypted user identification information, comparing the decrypted user identification information with the retrieved user identification information, retrieving a hashed verification record from a sealed verification record at the sealed verification record address, defining a retrieved verification record, and determining if the token from the user certification record address is valid. Upon determining the token from the user certification record address is valid, the user validation process may further comprise generating a generated verification record comprising the retrieved user identification information and the token, generating a hashed verification record by applying a hash function to the generated verification record, comparing the hashed verification record with the retrieved verification record and confirming a user identity by determining the decrypted user identification information and the retrieved user identification information are at least a partial match and the hashed verification record and the retrieved verification record are at least a partial match. Upon confirming the user identity, the method may further comprise generating a combination certificate comprising the user's certification record address, the object information, and the timestamp, configured to be shared by the user to verify the user's ownership of an object associated with the object information, generating a combination certificate hash value from a hash function including the combination certificate as an input, encrypting the combination certificate hash value with an issuer private key, defining an issuer signature, signing the combination certificate with the issuer signature, defining a signed combination certificate, recording the signed combination certificate to the digital certificate smart contract, and sending the combination certificate to the user.

In some embodiments the method may further comprise receiving hashed second user identification information associated with a second user and a derivative of the object information, defining a derivative object information, recording to a second digital certificate smart contract deployed at a second digital certificate smart contract address on a second blockchain network the hashed second user identification information and the derivative object information and a timestamp of when the hashed second user identification information and the derivative object information were received, defined as a received timestamp, signing the second digital certificate smart contract with a second issuer signature, generating a second combination certificate configured to be shared by the second user to verify the second user's ownership of a derivative object associated with the derivative object information, and sending the second combination certificate to the second user. Additionally, the method may further comprise receiving hashed third user identification information associated with a third user and the derivative object information, recording to a third digital certificate smart contract deployed at a third digital certificate smart contract address on a third blockchain network the hashed third user identification information and the derivative object information and a timestamp of when the hashed third user identification information and the derivative object information were received, defined as a received timestamp, signing the third digital certificate smart contract with a third issuer signature, generating a third combination certificate configured to be shared by the third user to verify the third user's ownership of a derivative object associated with the derivative object information, recording to the second digital certificate smart contract an indication that the second digital certificate smart contract is expired; and sending the third combination certificate to the third user.

In some embodiments the method may further comprise receiving hashed third user identification information associated with a third user and a second derivative of the object information, defining a second derivative object information, recording to a third digital certificate smart contract deployed at a third digital certificate smart contract address on a third blockchain network the hashed third user identification information and the second derivative object information and a timestamp of when the hashed third user identification information and the second derivative object information were received, defined as a received timestamp, signing the third digital certificate smart contract with a third issuer signature, generating a third combination certificate configured to be shared by the third user to verify the third user's ownership of a derivative object associated with the second derivative object information, and sending the third combination certificate to the third user. The second derivative object information may exist concurrently with the derivative object information.

Furthermore, embodiments of the invention may be directed to a system for issuing blockchain-based digital certificates comprising a processor, a data store positioned in communication with the processor; and a network communication device positioned in communication with each of the processor, the data store, and a network. The network communication device may be operable to receive from a user hashed user identification information, object information, and a user public key. The processor may be operable to record to a digital certificate smart contract deployed at a digital certificate smart contract address on a blockchain network the hashed user identification information and object information and a timestamp of when the hashed user identification information and the object information were received, defined as a received timestamp, and to sign the digital certificate smart contract with an issuer signature. Furthermore, the system may be operable to perform a user identity verification process to confirm a user identity, comprising the network communication device obtaining each of a sealed user record address, a sealed verification record address, and a token from a user certification record address at the user certification record address, the network communication device retrieving hashed user identification information from a sealed user record at the sealed user record address, defining retrieved user identification information, the processor decrypting the received user identification information using the user public key, defining decrypted user identification information, the processor comparing the decrypted user identification information with the retrieved user identification information, the network communication device retrieving a hashed verification record from a sealed verification record at the sealed verification record address, defining a retrieved verification record, and the processor determining if the token from the user certification record address is valid. The processor may be further operable to, upon determining the token from the user certification record address is valid, generate a generated verification record comprising the retrieved user identification information and the token; generate a hashed verification record by applying a hash function to the generated verification record, compare the hashed verification record with the retrieved verification record, and confirm a user identity by determining the decrypted user identification information and the retrieved user identification information are at least a partial match and the hashed verification record and the retrieved verification record are at least a partial match.

Additionally, the processor may be operable to, upon the user identity being confirmed, generate a combination certificate configured to be shared by the user to verify the user's ownership of an object associated with the object information. The network communication device may further be operable to send the combination certificate to the user.

BRIEF DESCRIPTION OF THE DRAWINGS

FIG. 4 is a reference implementation of Seal and Certification smart contracts, according to an embodiment of the invention.

FIG. 5 is an illustration of hardened derivation of a child key in a Hierarchical Deterministic wallet as proposed in BIP0032.

DETAILED DESCRIPTION OF THE INVENTION

Figure 1:
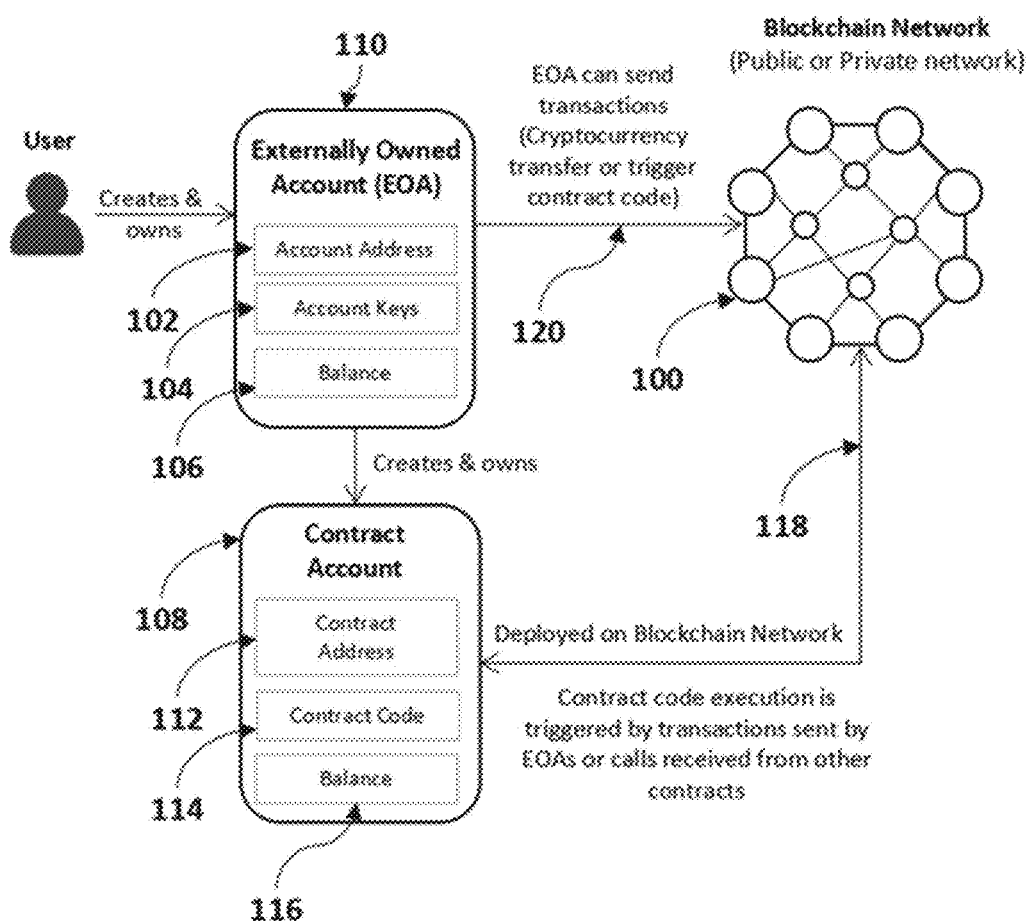
FIG. 1 is an illustration of the blockchain account types and interactions.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Referring to FIGS. 1-12, an Identity and Access Management system for Blockchain Interoperability according to an embodiment of the present invention is now described in detail. Throughout this disclosure, the present invention may be referred to as a Blockchain Identity and Access Management (B-IAM) system, a blockchain identity system, blockchain access management system, a blockchain access control system, a device, a system, a product, and a method. Those skilled in the art will appreciate that this terminology is only illustrative and does not affect the scope of the invention. Moreover, those skilled in the art will appreciate that all processes described herein may be performed by a computing device comprising, but not limited to, a network communication device operable to communicate across a network, such as a wide area network, including the Internet, a processor in communication with the networking communication device and operable to perform computing functions, and a data store capable of receiving, storing, and providing information to each of the network communication device and the processor.

Referring now to FIG. 1, for example, and without limitation, blockchain account types and interactions between them, are described in more detail. Blockchain is a distributed and public ledger which maintains records of all the transactions. A blockchain network 100 is a truly peer-to-peer network and it does not require a trusted central authority or intermediaries to authenticate or to settle the transactions or to control the network infrastructure. Users can interact and transact with the blockchain networks through Externally Owned Account (EOAs) 110, which are owned and controlled by the users. Each EOA 110 has an account address 102, account public-private keys 104 and a balance 106 (in certain units of a Cryptocurrency associated with the Blockchain network) associated with it. EOAs do not have any associated code. All transactions 120 on a blockchain network are initiated by EOAs. These accounts can send transactions to other EOAs or contract accounts. Another type of accounts support by second generation programmable Blockchain platforms are the Contract Accounts 108. A Contract Account 108 is created and owned by an EOA 110, is located at a contract address 112, and is controlled by the associated contract code 114 which is stored with the contract account 108. Additionally, the contract account 108 may comprise a balance 116, which may be identical to the balance 106 of the EOA 110. The contract code 112 execution is triggered by transactions 118 sent by EOAs or messages sent by other contracts.

Figure 2:
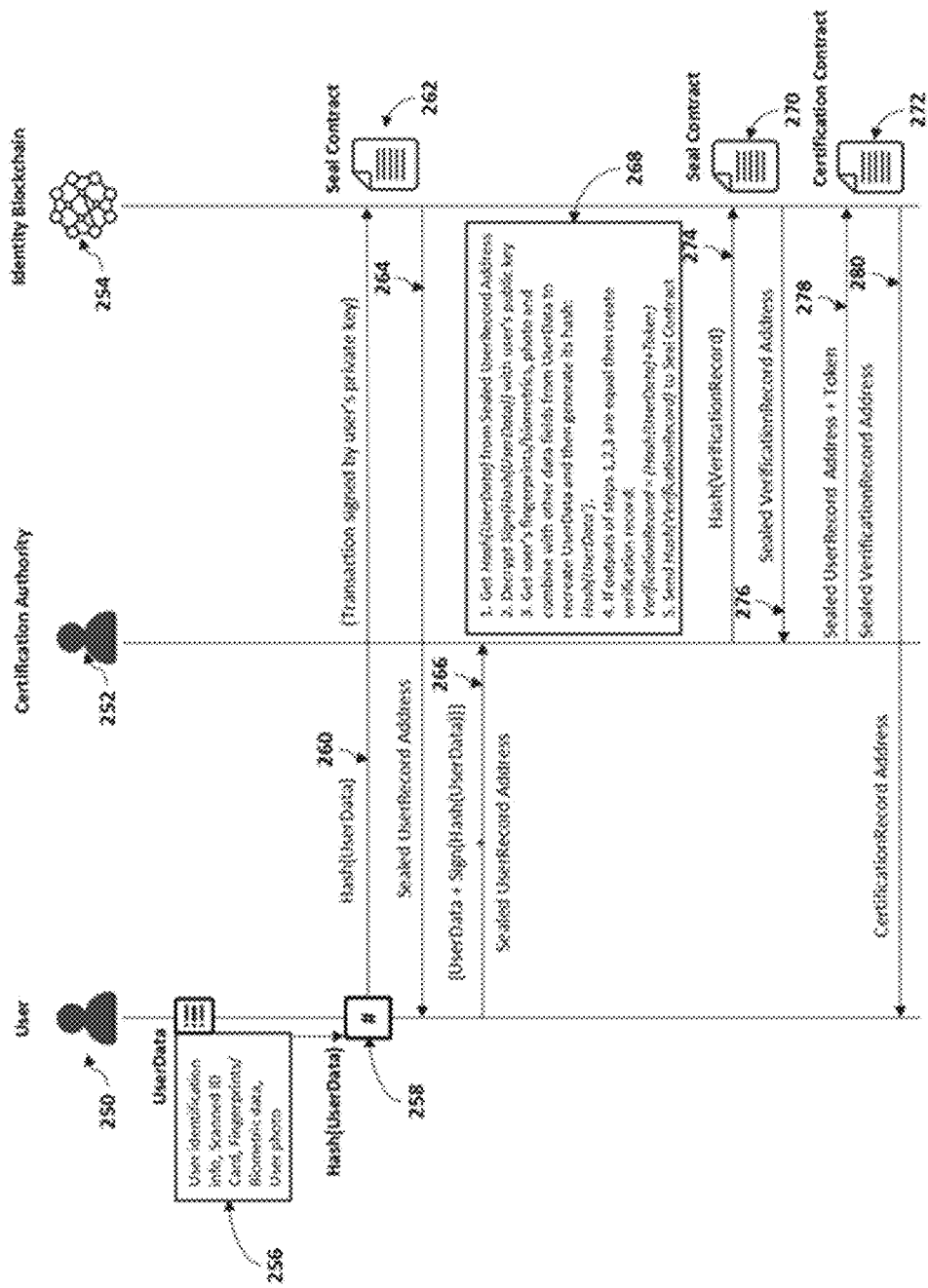
FIG. 2 is an illustration of the user registration and certification process, according to an embodiment of the invention.

An embodiment of the invention provides a system and associated methods for securely linking blockchain accounts to real users. Referring to FIG. 2, the user registration and certification process, for securely linking blockchain accounts to real users, is described in more detail. User registration process is done to link a real user 250 to one or more blockchain accounts. For the registration process, the user 250 either uses a registration application either on mobile or a desktop computer. In the registration application, the user provides the identification information (including fields such as name, address, date of birth and other identification information), scanned identification card (such as a driver license, passport or other types of ID cards), fingerprints and other biometric data, user photo, and any other type of data that can be used to identify the user. Each data field provided by the user in the registration application (collectively referred to as the 'UserData' 256) is hashed using a one-way hash function 258, generating hashed data 260. The registration application then creates a new smart contract from this hashed data 260, which is referred to as the 'Seal Contract' 262. The transaction to create this new Seal Contract 262 on the blockchain network is signed by the user's private key. The Seal Contract 262 maintains a record of the hashed user data and the user's address on the blockchain network. A separate private and/or permissioned blockchain 254 may be used for user identity management, where the Seal Contract is deployed. When the transaction to create the new Seal Contract is mined, the user gets an address of the contract, which is referred to as the 'Sealed UserRecord Address' 264. This completes the user registration process.

The next step is the certification process, in which the user provides the 'UserData', digitally signed and hashed 'UserData', and the 'Sealed UserRecord Address' 266 to a certification authority 252. The data is signed by the user's private key. This data may be shared with the certification authority 252 over an encrypted and secure channel, so that only the certification authority can decrypt and access the data. The certification authority 252 then verifies if the UserRecord has been created and sealed by the user 250 and if the user own's the record and the associated Seal Contract 262 by performing a certification process 268. The steps involved in the certification process 268 may include, as follows:

1. Get Hash(UserData) from Sealed UserRecord Address
2. Decrypt Sign(Hash(UserData)) with user's public key
3. Get user's fingerprints and/or biometric data, user photo and combine with other data fields from UserData to recreate UserData and then generate its hash: Hash(UserData').
4. If outputs of steps 1, 2, 3 above are equal then create verification record as follows:
VerificationRecord=(Hash(UserData)+Token)
5. Create a new Seal Contract with Hash(VerificationRecord) 274 as the input data.

The transaction to create this new Seal Contract 270 on the blockchain is signed by the certification authority's private key. When the transaction to create the new Seal Contract 270 is mined, the certification authority 252 gets an address of the contract, which is referred to as the 'Sealed VerificationRecord Address' 276.

Next the certification authority creates a new smart contract, referred to as the 'Certification Contract' 272 by providing the Sealed UserRecord Address 264, Certification Token and Sealed VerificationRecord Address 276 as the input data 278 to the contract. When the transaction to create the Certification Contract 272 is mined, the certification authority gets an address of the contract, which is referred to as the 'CertificationRecord Address' 280, and shares this address with the user. This completes the user certification process. The certification process establishes the ownership of the blockchain account (and its associated public-private key-pairs) to a real user 250 whose identity is verified by the certification authority 252. The certification token can be used to set a validity or a timeout period for a key-pair. After the timeout of the certification of key-pair, the certification process has to be done again. This certification renewal process adds additional security and prevents against any misuse of keys.

Figure 3:
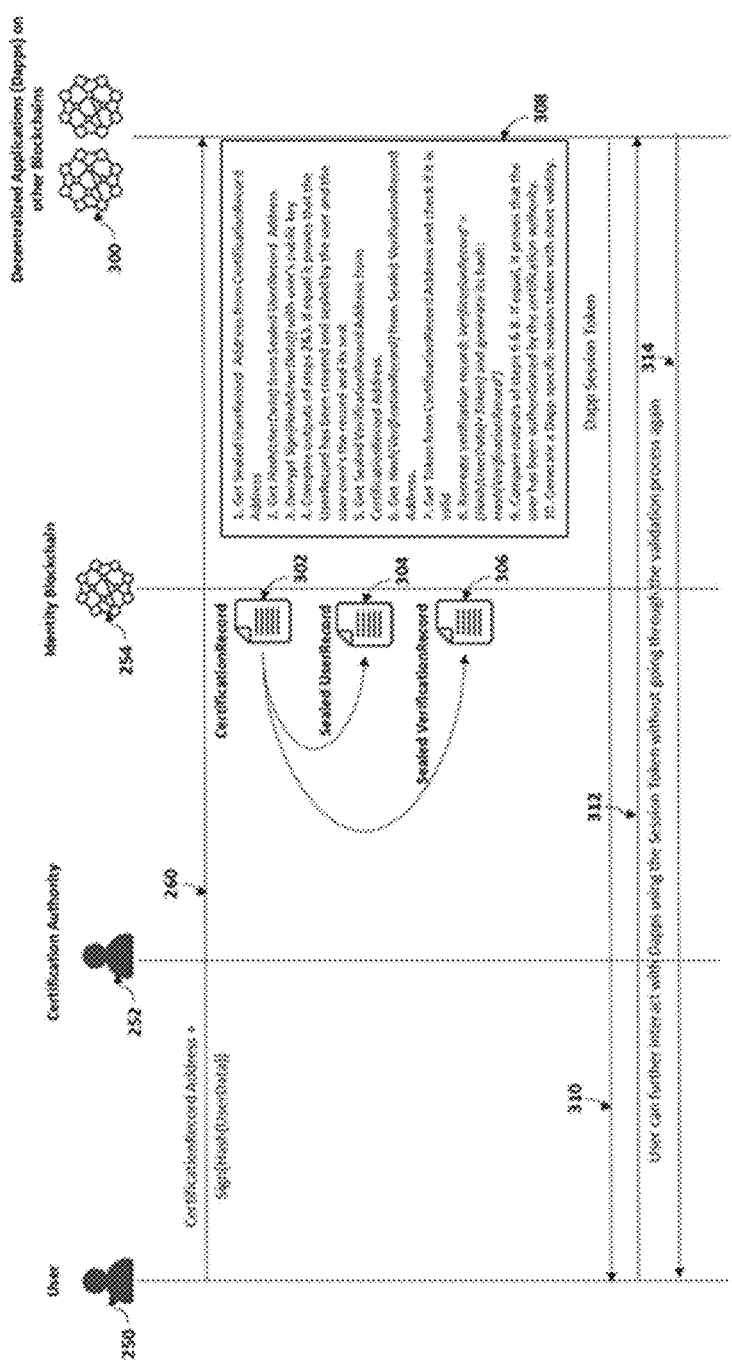
FIG. 3 is an illustration of the user validation process, according to an embodiment of the invention.

Referring to FIG. 3, a method aspect of the present invention for user validation is described in more detail. A certified user 250 can then interact with blockchain applications (either smart contracts or decentralized applications). These blockchain applications may be deployed on different blockchain networks 300. When a blockchain application requests the identity of a certified user 250, the user sends the CertificationRecord Address and the signed and hashed UserData 260 to the blockchain application. The blockchain application then carries out the validation process 308. The steps involved in the validation process 308 may include, as follows:

1. Get Sealed UserRecord Address 304 from CertificationRecord Address 302
2. Get Hash(UserData) from Sealed UserRecord Address 304
3. Decrypt Sign(Hash(UserData)) with user's public key
4. Compare outputs of steps 2 and 3. If equal it proves that the UserRecord has been created and sealed by the user and the user own's the record and its seal.
5. Get Sealed VerificationRecord Address 306 from CertificationRecord Address
6. Get Hash(VerificationRecord) from Sealed VerificationRecord Address 306
7. Get Token from CertificationRecord Address and check if it is valid
8. Recreate verification record: VerificationRecord'=(Hash(UserData)+Token) and generate its hash: Hash(VerificationRecord')
9. Compare outputs of steps 6 and 8. If equal, it proves that the user has been authenticated by the certification authority.

The above steps complete the user validation process 308. Once a user has been validated, the blockchain application may generate an application specific session token 310 (with a short validity), so that the user can interact 312, 314 further with the application without going through the validation process again for each transaction. A reference implementation of Seal 350 and Certification 352 smart contracts, according to an embodiment of the invention, is shown in FIG. 4.

An embodiment of the invention provides a system and associated methods for key generation and management, where a user can generate a large number of keys in a deterministic manner for use on a single blockchain network or across multiple blockchain networks.

Referring now to FIG. 5, a hardened derivation of a child key in a Hierarchical Deterministic (HD) wallet as proposed in the Bitcoin Improvement Proposal (BIP0032) is described in more detail. An HD wallet contains a hierarchy of keys which are derived in a tree structure. The master key in an HD wallet is derived from a single root seed. HD wallets use child key derivation (CKD) functions to derive children keys from parent keys. The child private key 212 and child public key 214 are derived from the parent keys, and a chain code 202 which adds extra bits of entropy. The inputs to a CKD function 206 are a public or private key 200, a chain code 202 and an index 204. The public or private key 200 and chain code are combined to create an extended key (public or private). With a private extended key it is possible to derive the entire branch of keys in the sub-tree structure rooted at the private extended key. Whereas, with a public extended key only the public keys in the entire branch can be derived. While the ability to derive the entire branch of public keys is very useful, however, it comes at a potential risk of leaking the entire tree structure. This risk is due to the fact that the extended public key also contains the chain code. If the extended public key and a child private key descending from it are revealed, an attacker can use them to generate the parent extended private key. With this parent extended private key all the child private and public keys may be created. To counter this risk, a method of generation of 'hardened' keys is provided in HD wallet where a parent private key 200 is used to derive the child chain code 216 instead of the parent public key. A limitation of the 'hardened' child key derivation mechanism in BIP0032 is that it does not give any protection in the case of a leak of a private extended key. If a private extended key is leaked the entire sub-tree of keys can be derived.

Figure 6:
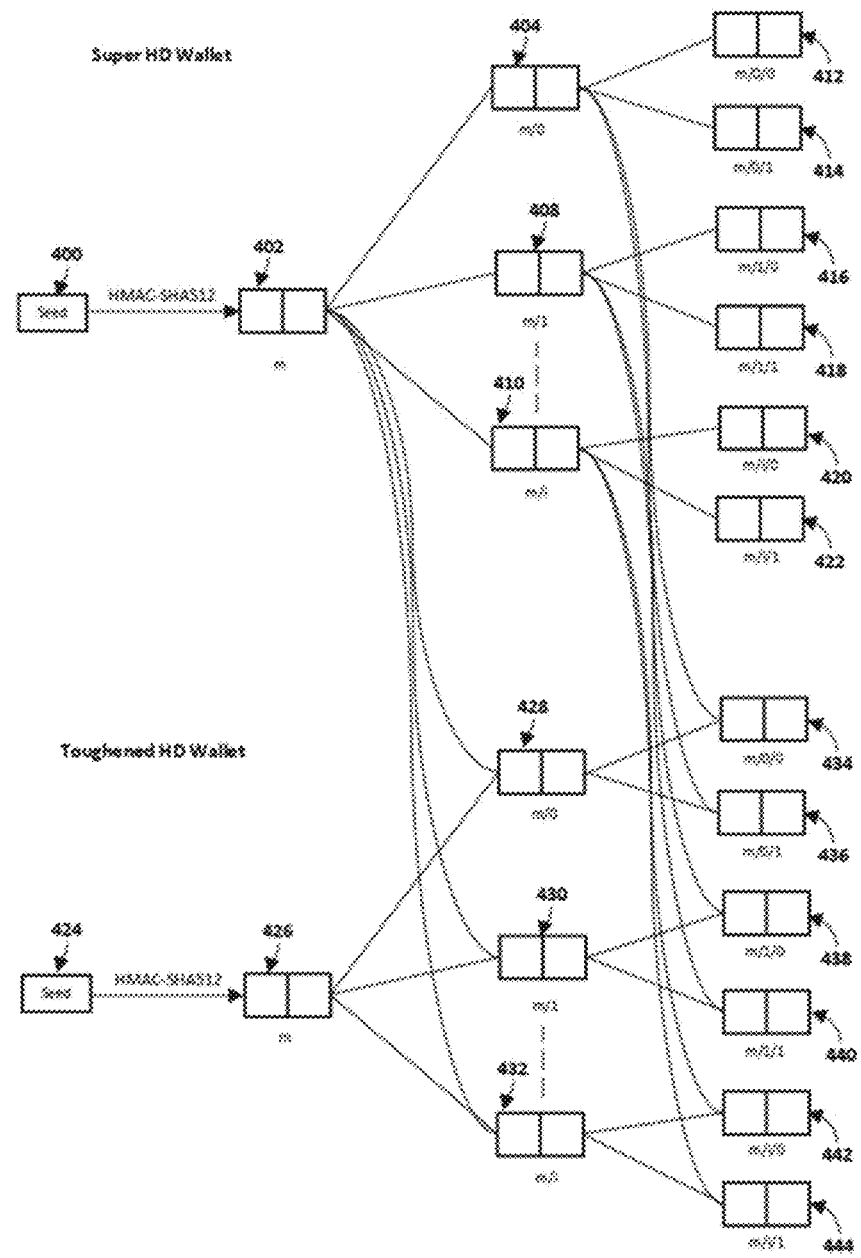
FIG. 6 is an illustration of a toughened HD wallet (an improvement over the Hierarchical Deterministic wallet as proposed in BIP0032), according to an embodiment of the invention.

Referring to FIG. 6, a method aspect of the present invention for key generation is described in more detail. We present an extension to Hierarchical Deterministic (HD) wallets, which adds additional levels of security to counter leak of private extended keys. For each user a 'Super HD Wallet' is created using the HD wallet mechanism described above. More specifically, a primary seed 400 that may comprise a parent public or private key, a parent chain code, and an index, may be received and an enhanced hierarchical deterministic wallet comprising an enhanced parent public key and an enhanced parent private key pair 402 may be generated by applying a CKD function to the primary seed 400. Additionally, the enhanced hierarchical deterministic wallet may further comprise one or more enhanced primary child public/private key pairs 404, 408, 410, where the enhanced primary child public keys is derived from the enhanced parent public key and the enhanced primary child private key is derived from the enhanced parent private key. Moreover, the enhanced hierarchical deterministic wallet may further comprise one or more enhanced secondary child public/private key pairs 412, 414, 416, 418, 420, 422 derived enhanced primary child public/private key pairs 404, 408, 410.

Next, for each blockchain network, separate 'Toughened HD Wallets' are created. The child keys in a 'Toughened HD Wallet' depend not just on their parent but also on the corresponding parent in the 'Super HD Wallet' (the key at the same path in the Super HD wallet as the parent key). More specifically, a first secondary seed 424, similar to the primary seed 400, may be received and a first toughened hierarchical deterministic wallet may be generated by deriving a first toughened parent public/private key pair 426 from the first secondary seed 424 and a first toughened primary child public/private key pair 428 from the first toughened parent public/private key pair 426. A second toughened primary child public/private key pair 430 may also be derived from the first toughened parent public/private key pair 426. Indeed, any number of toughened primary child public/private key pairs 432 may be derived. Additionally, first and second toughened secondary child public/private key pairs 434, 436 may be derived from the first toughened primary child public/private key pair 428, first and second toughened secondary child public/private key pairs 438, 440 may be derived from the second toughened primary child public/private key pair 430, and any number of toughened secondary child public/private key pairs 442, 444 may be derived from toughened primary child public/private key pairs 432.

While a single toughened hierarchical deterministic wallet is depicted, second, third, and any number of toughened hierarchical deterministic wallets, generated by respective secondary seeds and comprising toughened parent public/private key pairs and any number of primary, secondary, tertiary, and any hierarchically subsequent toughened child public/private key pairs, is contemplated and included within the scope of the invention.

The super or enhanced HD wallet keys can be derived using the same or similar approaches as in BIP32 for this. This "super" or "enhanced" HD wallet is differentiated from the other "toughened" wallets used for each blockchain network further because the "super" or "enhanced" wallet is generated for each user (e.g., are linked to the user identity) whereas "toughened" wallets are generated separately for each blockchain network account that the user's account participates in.

Figures 7, 8:
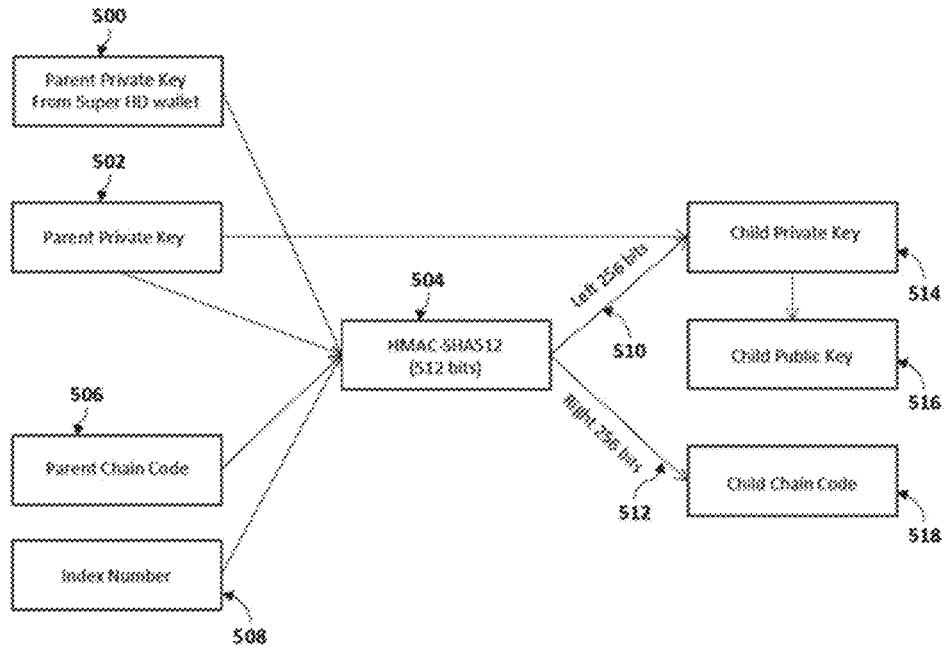
FIG. 7 is an illustration of the toughened and hardened derivation of a child key, according to an embodiment of the invention.
FIG. 8 is an illustration of the examples of toughened and hardened child key derivations, according to an embodiment of the invention.

Referring to FIG. 7, a method aspect of the present invention for the toughened and hardened key derivation will now be discussed in detail. In a normal HD Wallet the Child Key Derivation functions for private and public keys are as follows:

CKDpriv((kpar, cpar), i)→(ki, ci)
CKDpub((Kpar, cpar), i)→(Ki, ci)

where, child private key (ki) and child public key (Ki) depend on their parents keys and the parent chain code.

In a 'Toughened HD Wallet' enhanced child key derivation functions are proposed as follows:

CKDprivTough((kpar, cpar), kparsuper, i)→(ki, ci)
CKDpubTough((Kpar, cpar), Kparsuper, i)→(Ki, ci)

where, child private key (ki) 514 and child public key (Ki) 516 depend on their parents keys 502, parent chain code 506 and the corresponding key from the Super HD Wallet 502 (i.e., key at the same path as their parent), as modified by a CKD function 504. Additionally, an index number 508 may also be included in as an input to the CKD function 504. Moreover, in some embodiments, the CKD function 504 may be operable to generate a number of bits that is greater than the number of bits necessary to generate the child private key 514. For example, in the present embodiment, the CKD function 504 may generate 512 bits, where 256 bits are required for the child private key 514. Accordingly, a subset of the 512 bits generated by the CKD function 504, e.g., the "left" 256 bits 510, as is known in the art, may be used to generate the child private key 514. Additionally, the "right" 256 bits 512, as is known in the art, but in any case the bits not used to generate the child private key 514, may be utilized as a child chain code 518 for the derivation/generation of toughened child public/private key pairs.

FIG. 8 shows examples of using reference implementations of toughened and hardened child key derivation functions.

Figure 9:
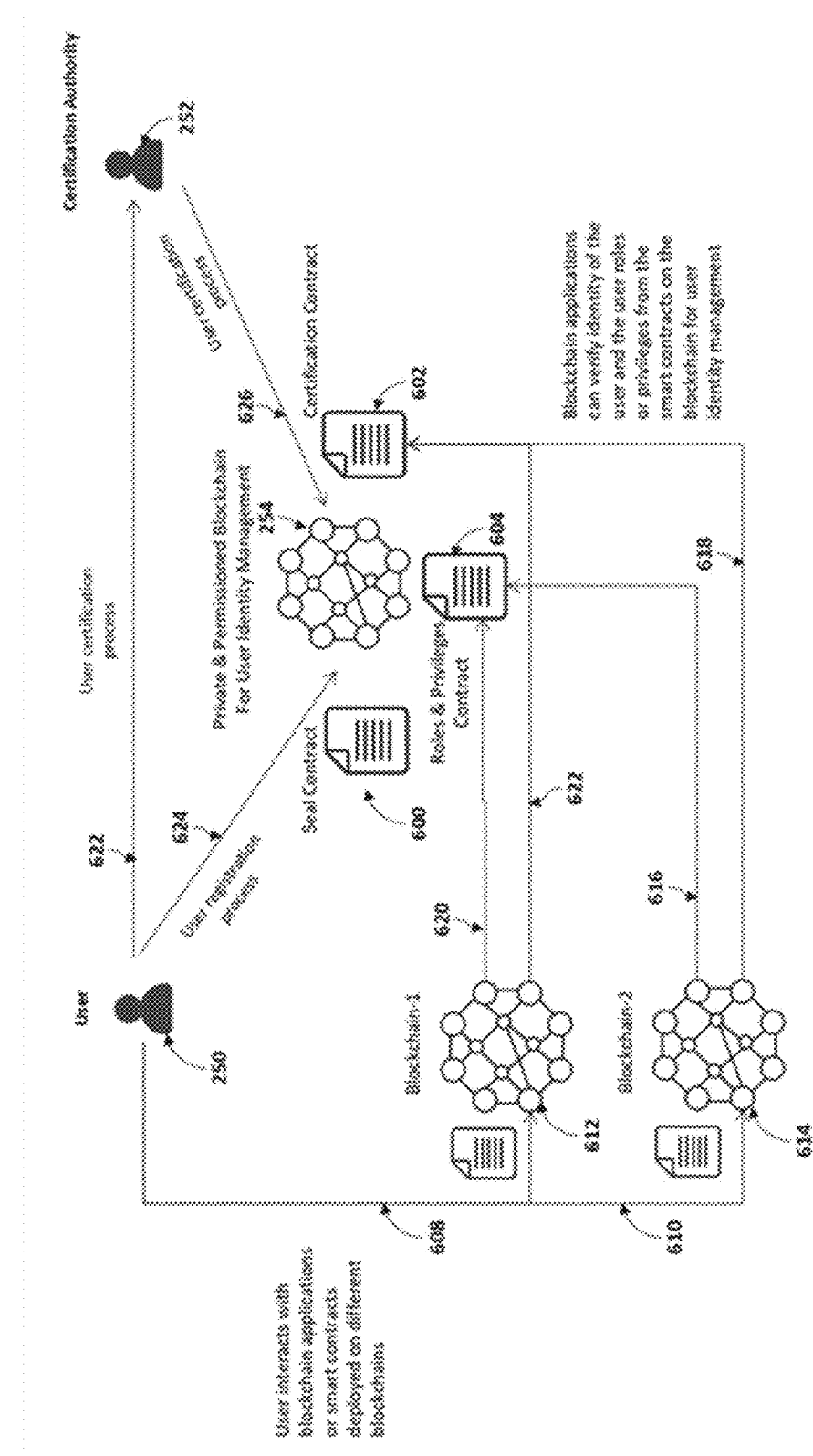
FIG. 9 is an illustration of the user interactions with multiple blockchain networks, according to an embodiment of the invention.
Figure 10:
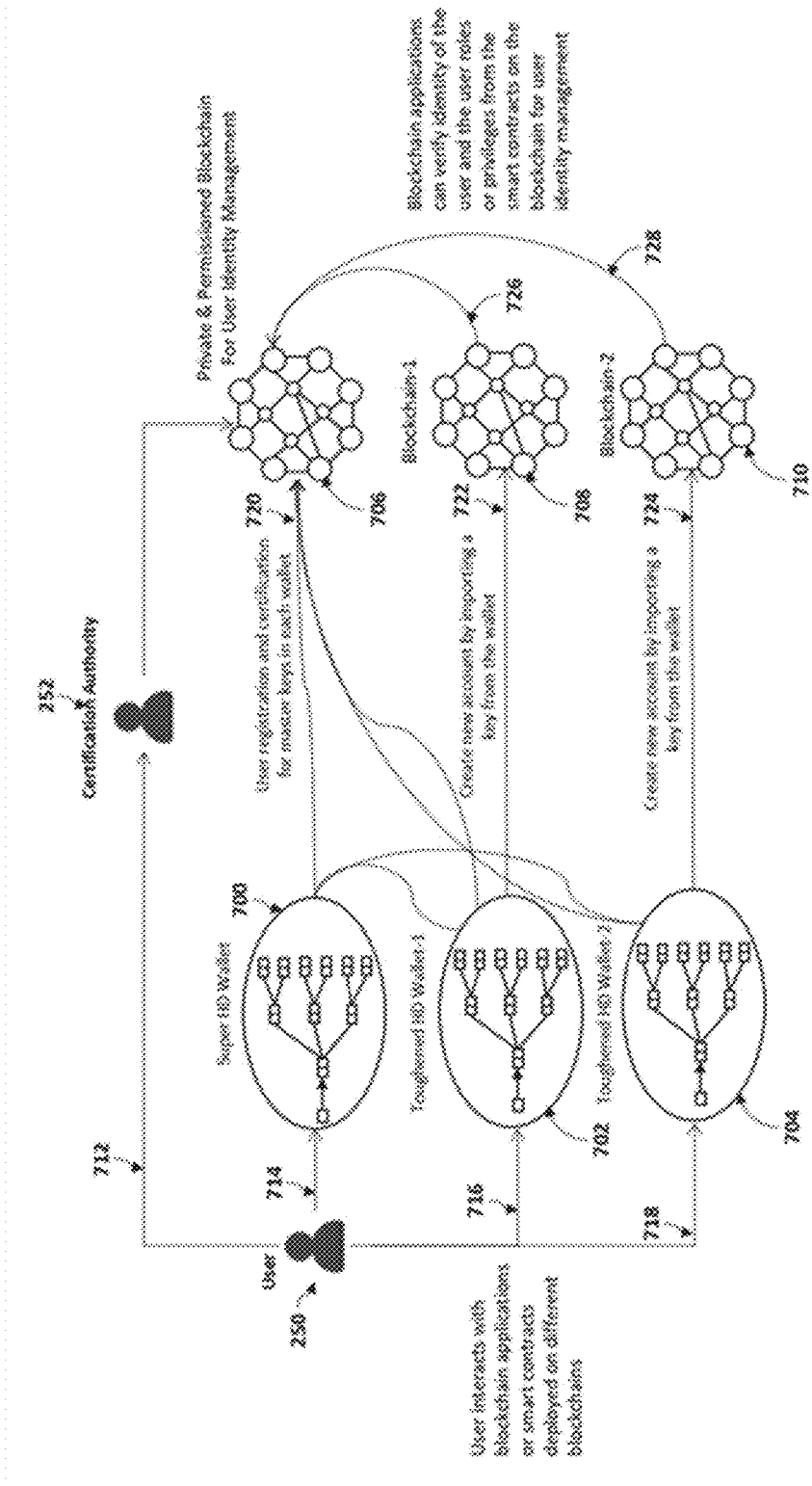
FIG. 10 is an illustration of the scenarios for using wallet keys with different blockchain networks, according to an embodiment of the invention.

An embodiment of the invention provides a system and associated methods for maintaining user identity across multiple blockchain networks. Referring to FIGS. 9 and 10, a method aspect of the present invention for maintaining user identity across multiple chains is described in more detail. For each user a 'Super HD Wallet' 700 is created 714 and separate 'Toughened HD Wallets' 702, 704 are created 716, 718 for separate blockchain networks 612/708, 614/710. The user registration process 624 needs to be done only once for a user, generating a seal contract 600 as described hereinabove. The certification process 626/720 can be carried out once for the Super HD wallet and then for each Toughened HD wallet, generating a certification contract 602 as described hereinabove. Once a master key in a HD wallet (Super or Toughened) has been certified for a user, the ownership of a child key can be verified by sharing the derivation path from master to child key without the need to through the whole certification and validation process again when the master key is already certified. To use a child key from a Toughened HD wallet on a blockchain network, the user creates a new blockchain account by importing 722, 724 the key 608, 610 from the Toughened HD Wallets 702, 704. The identity of the user may be verified 726, 728 by the blockchain networks 612/708, 614/710 accessing 622, 618 the certification contract 602.

The derived child keys in a 'Toughened HD wallet' can be used in several ways, described as follows:

1) In one embodiment, the child public keys can be used for receiving funds and the private keys are required for spending funds.

2) In another embodiment, new child keys can be derived and used for each session or each transaction.

3) In another embodiment, specific roles and privileges can be assigned to specific child keys or specific sub-trees in a Toughened HD wallet. A smart contract 604 on the user identity blockchain can maintain a mapping from the child keys to specific roles and privileges. The smart contract 604 may function to ensure requests 620, 616 made by the respective blockchain networks 612, 614 comply with the specific roles and privileges made for those blockchain networks.

4) In another embodiment, a smart contract can be used to maintain a mapping from the child keys to their respective timeout periods.

5) In another embodiment, a smart contract can be used to control key reuse, where a key can be allowed to be used for a limited number of transactions only.

6) In another embodiment, smart contracts can be used for information sharing on the user accounts across different blockchain networks.

The proposed methods of maintaining user identity across multiple blockchain networks, can prevent a rogue user from accessing blockchain applications by impersonating a real user. While a rogue can try to generate one or more HD wallets (with normal or hardened keys) and attempt to access blockchain applications on different chains, however, since these applications require the user's master keys to be certified, they will reject access to the user when the validation process is performed as there will be no linked Super HD wallet for which a certification exists on the identity blockchain.

Figure 11:
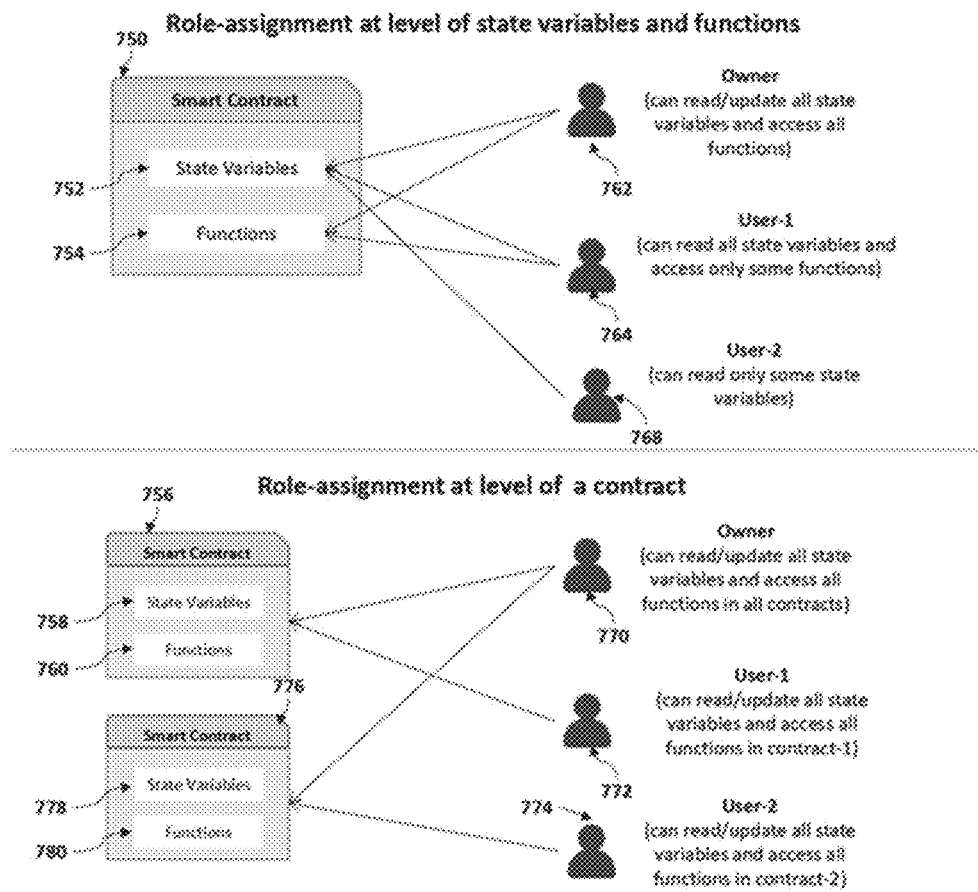
FIG. 11 is an illustration of the examples of roles based access control with different roles assigned to different users, according to an embodiment of the invention.
Figure 12:
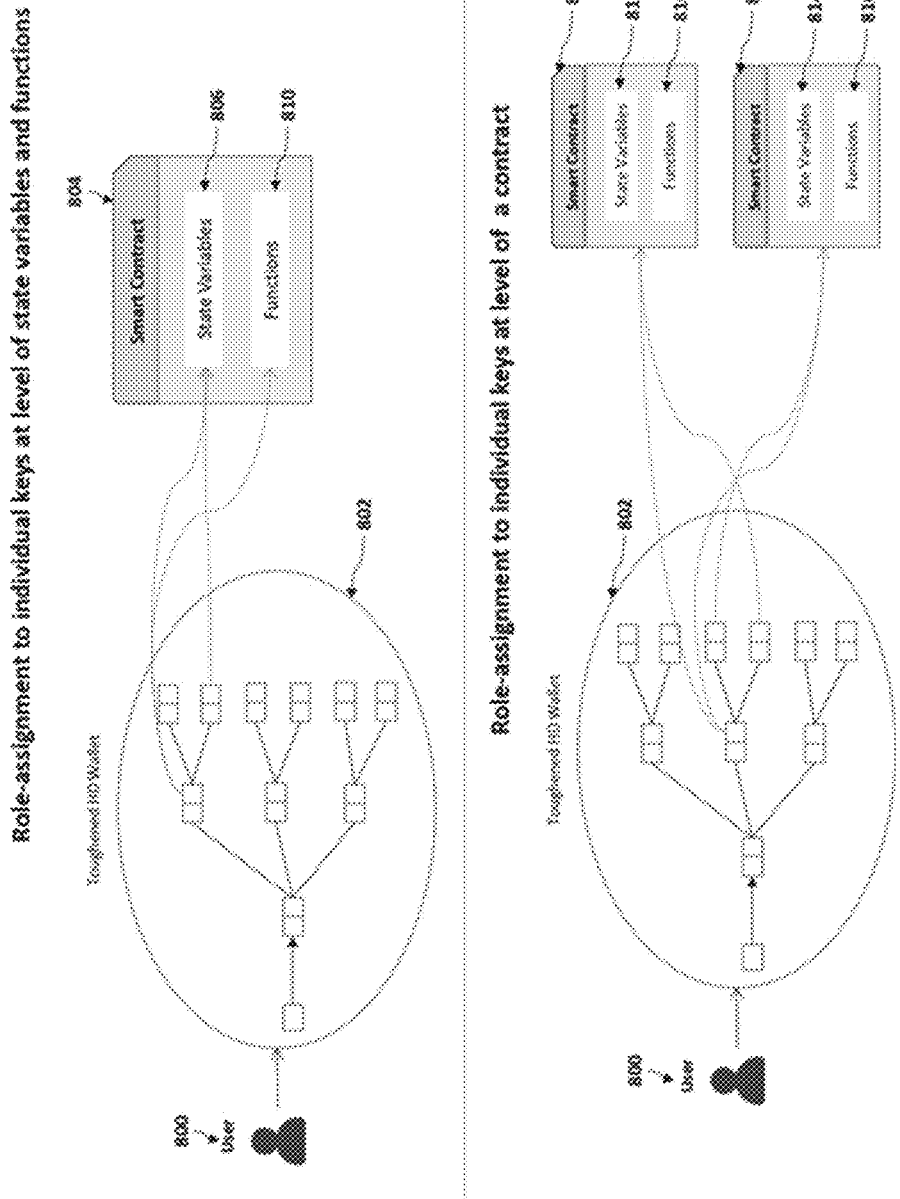
FIG. 12 is an illustration of the examples of roles based access control, with role assignment to individual keys belonging to a user, according to an embodiment of the invention.

An embodiment of the invention provides a system and associated methods for role-based access control in blockchain applications. Referring to FIGS. 11 and 12, a method aspect of the present invention for role-based access control is described in more detail. Role-based access control for blockchain applications is used to restrict access to authorized users. The role-based access control system allows defining roles and policies which control access to the blockchain applications and their associated smart contracts. A role is a set of permissions which grant access to particular resource of a blockchain application (for example, a state variable or a function in the smart contract, or a collection of smart contracts). Policies are attached to roles which define the permissions for the roles. The information about roles and policies for a blockchain application may be maintained in a smart contract on the identity blockchain. Role assignments maybe done in the following ways:

1) In one embodiment, as shown in FIG. 11, where a blockchain application has a single smart contract 750 (that includes a set of state variables 752 and functions 754), the role assignments may be done to specific state variables 752 and functions 754. For example, a user in the role of a contract owner 762 would have access to read and update all state variables 752 and access all the functions 754 of the smart contract 750. Whereas, other users 764, 768 may have access to only a subset of the state variables and functions.

2) In another embodiment, as shown in FIG. 11, where a blockchain application has multiple smart contracts 756, 776 the role assignments may be done at the level of smart contracts. For example, a user in the role of the application owner 770 would have access to read and update all state variables 758, 778 and access all the functions 760, 780 in all the smart contracts 756, 776 in the application. Whereas, other users 772, 774 may have access to only certain smart contracts in the application.

3) In another embodiment, as shown in FIG. 12, different roles may be assigned to different child keys belonging a certified user 800. For example, a derived key at path m/0/1 in the user's toughened HD wallet 802 may be allowed to access all the state variables 806 and functions 810 in a smart contract 804 and, alternatively, all state variables 814, 814' and functions 816, 816' in smart contracts 812, 812', whereas a derived key at path m/0/0/1 in the user's toughened HD wallet 802 may be allowed to access only a subset of state variables and functions, e.g. either state variables 814 and functions 816 of smart contract 812 or state variables 814' and functions 816' of smart contract 812'.

4) In another embodiment, additional constraints (at the contract or application-level) may be defined within the policies attached to roles. For example, in a case of a voting application on the blockchain, a user may be allowed to vote only once (i.e., send a transaction to the vote function of the smart contract only once).

Figure 13:
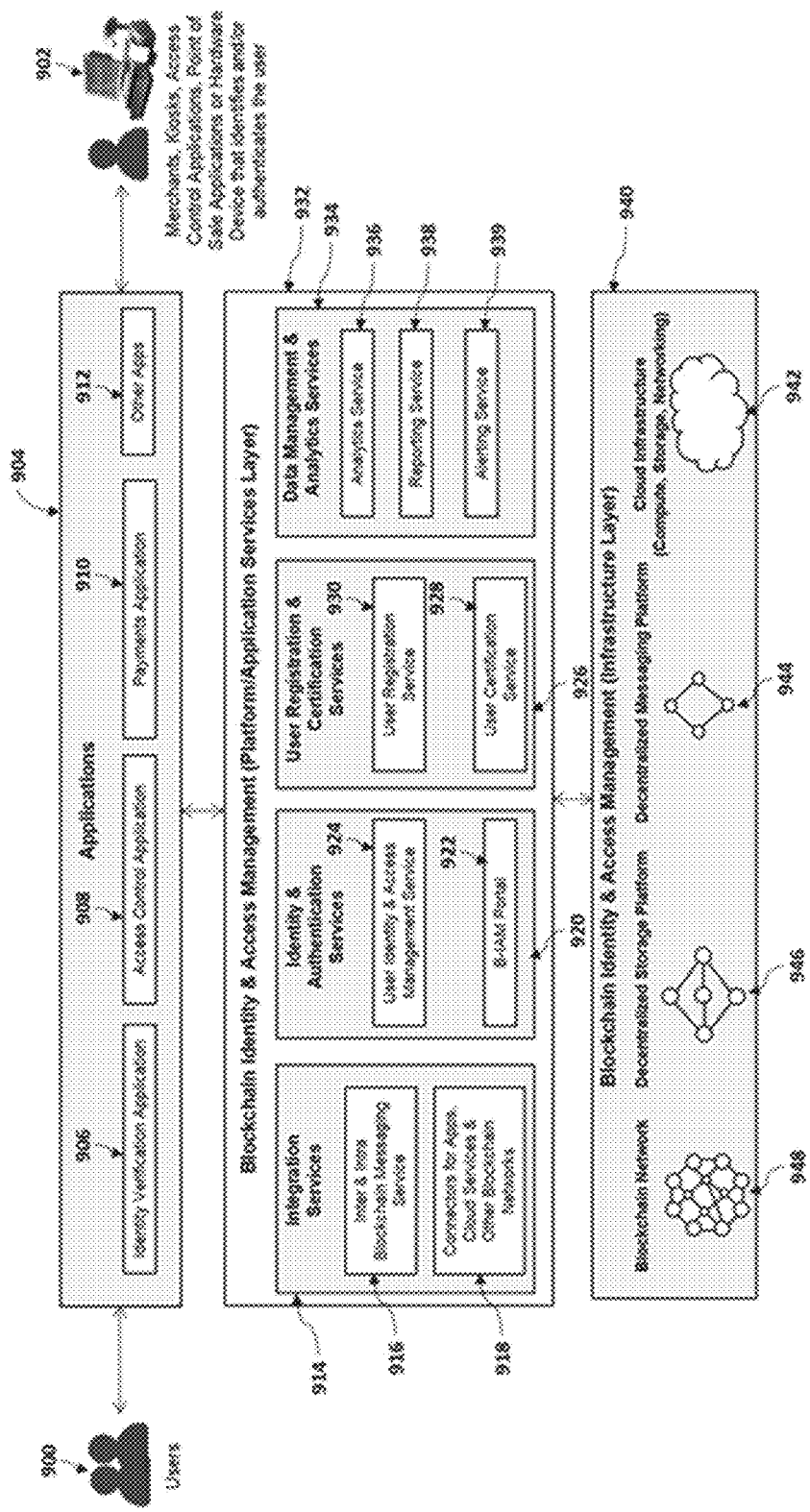
FIG. 13 is a schematic diagram of a blockchain identity and access management system (B-IAM), according to an embodiment of the present invention.

Referring to FIG. 13, a blockchain identity and access management system (B-IAM) system according to an embodiment of the present invention is now described in detail. The B-IAM system's infrastructure layer 940 comprises a blockchain network 948, a decentralized storage platform 946, decentralized messaging platform 944 and cloud infrastructure 942. All the smart contracts related to user identity management (such as the Seal Contract, Certification Contract, Roles & Privileges Contract) deployed on the blockchain network 948. For 948, a blockchain platform such as Ethereum can be used. The decentralized messaging platform 944 is used for messaging between the decentralized applications (Dapps), which are built on the B-IAM system. For 944, a decentralized messaging platform such as Whisper, can be used. Whisper messages are transient in nature and have a time-to-live (TTL) set. Each message has one or more topics associated with it. The Dapps running on a blockchain node inform the node about the topics to which they want to subscribe. Whisper uses topic-based routing where the nodes advertise their topics of interest to their peers. Topics are used for filtering the messages which are delivered to a node which are then distributed to the Dapps running on the blockchain node. The decentralized storage platform 944 is used for storing user data such as user photos, and scanned identity documents. For 946, a decentralized storage platform such as Swarm can be used. Swarm is a decentralized storage platform and content distribution service for the Ethereum blockchain platform. Swarm is a peer-to-peer storage platform which is maintained by the peers who contribute their storage and bandwidth resources. Swarm has been designed to dynamically scale up to serve popular content and has a mechanism to ensure the availability of the content which is not popular or frequently requested. The cloud infrastructure 942, is used for collection, storage and analysis of application usage data.

The B-IAM system's platform and application services layer 932 comprises Integration Services 914, Identity & Authentication Services 920, User Registration & Certification Services 926, Data Management & Analytics Services 934. The Integration Services 914, comprise Inter-Blockchain and Intra-blockchain Messaging Services 916, and various connectors for applications, cloud services and other blockchain networks 918. The Identity & Authentication Services 920 comprise a User Identity & Access Management Service 924, and a B-IAM portal 922. The B-IAM portal 922 allows users 900 to access and monitor their identity data recorded in the B-IAM system and view identity requests made by different applications. The User Registration & Certification Services 926 comprise a User Registration Service 930 (which is used for the process flow as shown in FIG. 2) and a User Certification Service 928 (which is used for the process flow as shown in FIG. 3). The Data Management & Analytics Services 934, are deployed on the cloud infrastructure 942. These include an analytics service 936, reporting service 938, and an alerting service 939. The analytics service 936, can analyze multi-blockchain behavior of a user account to ensure compliance. It is contemplated and included within the scope of the invention that all of these platforms and applications services are operable on a computerized device comprising a processor, a network communication device, and a data storage device as described hereinabove.

The B-IAM system can be used for providing identity, access management and authentication services for a wide range of applications 904. Some exemplary applications that can benefit from the B-IAM system include an identity verification application 906, access control application 908 and a blockchain-based payments application 910. All of these may communicate with third party devices and applications 902 that identifies and/or authenticates the users 900.

Figure 14:
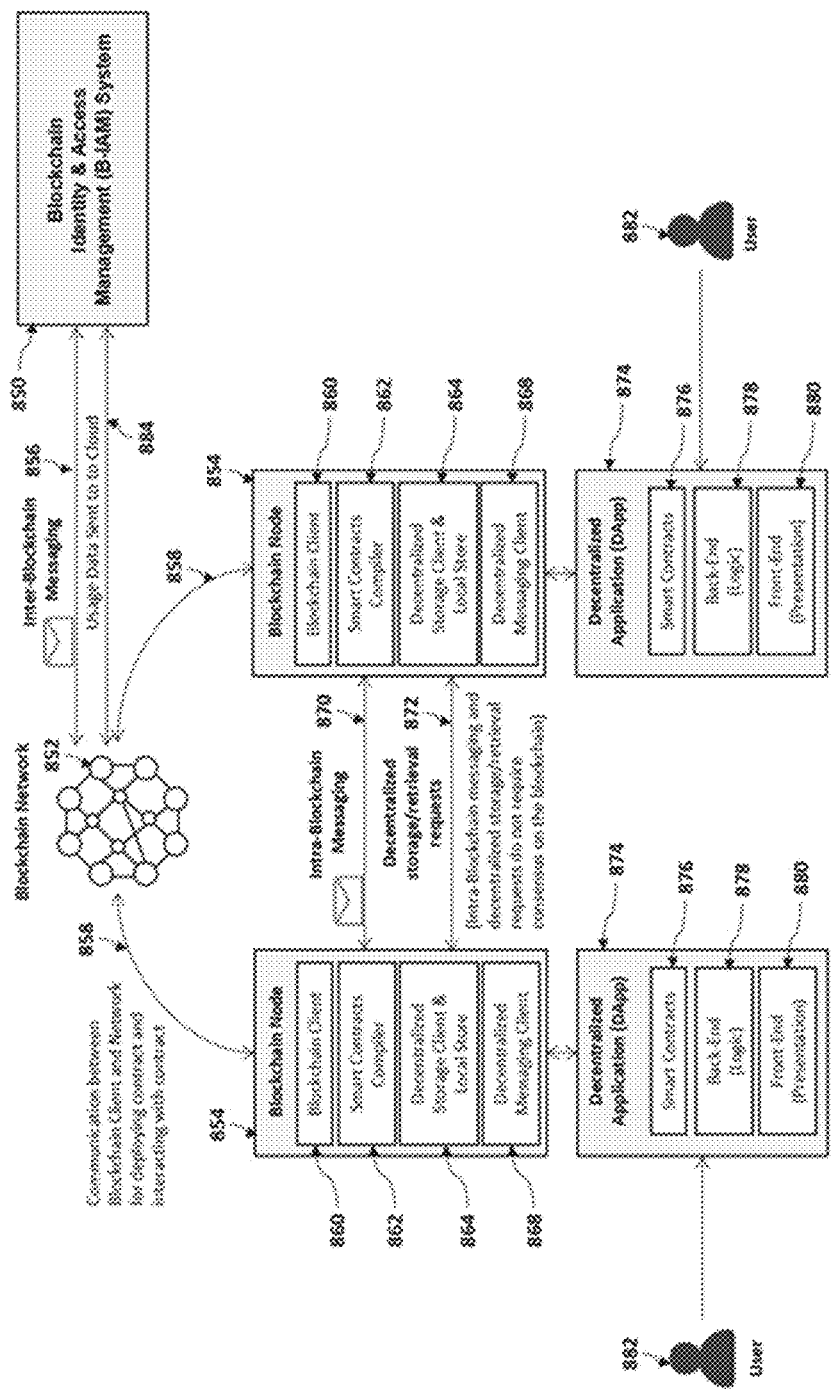
FIG. 14 is an illustration of the interactions between the B-IAM system and other blockchain networks and decentralized applications, according to an embodiment of the present invention.

Referring to FIG. 14 the interactions between the B-IAM system 850 and other blockchain networks 852 and decentralized applications 874, according to an embodiment of the present invention are now described in detail. The B-IAM system can be used to provide user identity and access management services for various decentralized applications deployed on different blockchain networks. The B-IAM allows a user to work on multiple blockchain networks, or multiple applications deployed on the same blockchain networks, while maintaining the same identity. The blockchain network 852 can communicate 858 with the B-IAM system using an Inter-Blockchain Messaging protocol 856. The blockchain network 852 can also send usage data 884 (such as application usage and user interactions data) to the B-IAM system. Applications deployed on a blockchain network 852 are either in the form of smart contracts 876 or Dapps 874. A smart contract is a piece of code which is deployed on the blockchain network and is uniquely identified by an address. While smart contracts can directly be used by end users 882 who can send transactions or calls to the smart contracts through blockchain clients, however, to provide a more user-friendly interface to smart contracts, Dapps can be developed and applied over these smart contracts. A Dapp 874 includes one or more associated smart contracts 876, a front-end user interface 880 (which is typically implemented in HTML and CSS) and a back-end 878 (which is typically implemented in JavaScript). Users can submit transactions to the smart contract 876 associated with a Dapp from the Dapp's web interface itself. The Dapp's web interface forwards the transactions to the blockchain platform 852 and displays the transaction receipts or state information in the smart contracts in the web interface. A Dapp is deployed on a blockchain node 854 which serves the Dapp's web-based user interface. The Dapp logic is controlled by the associated smart contracts 876 which are deployed on the blockchain platform 852. Dapps which have special storage requirements can make use of a decentralized storage platform (such as Swarm). Similarly, Dapps which have special messaging requirements can leverage a decentralized messaging platform (such as Whisper). A blockchain node 854 typically comprises a blockchain client 860 that sends transactions to the blockchain network 852, a smart contracts compiler 862, a decentralized storage client & local store 864, and a decentralized messaging client 868. While the smart contracts are deployed on the blockchain network, Intra-blockchain messaging 870 (over a decentralized messaging platform) and decentralized storage/retrieval requests 872 (over a decentralized storage platform) work off the chain as they do not require a consensus on the blockchain.

Figure 15:
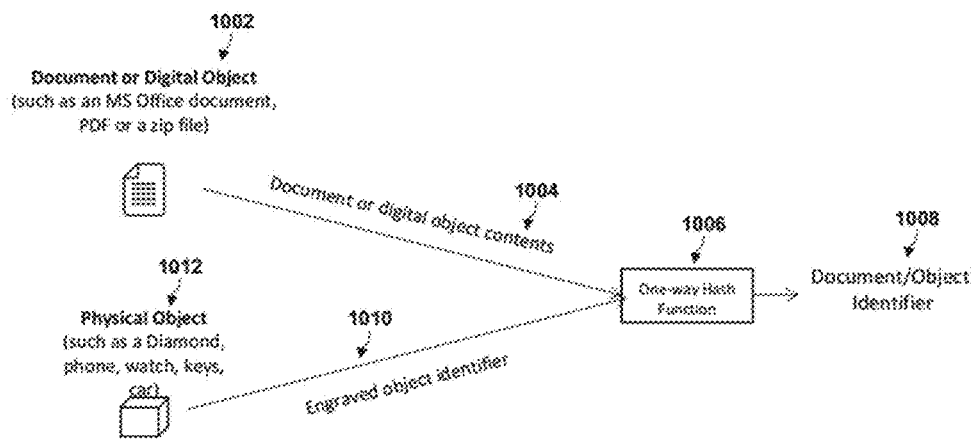
FIG. 15 is an illustration of the process to generate a unique document or object identifier, according to an embodiment of the invention.

Referring to FIG. 15, a method for generating a unique document or object identifier, according to an embodiment of the present invention is now described in detail. For a document or digital object 1002 (such as a word processing document, such as a Microsoft Office Word document, PDF or a zip file), the contents 1004 of the document or object are input to a cryptographic hash function 1006 (such as SHA-3, although all other cryptographic hash functions as are known in the art are contemplated and included within the scope of the invention) to generate a unique identifier 1008. The identifier 1008 for a document of digital object is specific to the contents of the document or object and any change in the document or object contents changes the cryptographic hash. For a physical object 1012 (such as a diamond, phone, car, watch, keys) an object identifier (such as a laser inscription in a diamond, phone IMEI number, car engine or chassis number, an engraved number on a key) associated with the physical object 1012 is input to the cryptographic hash function 1006 to generate the unique identifier 1008.

Figure 16:
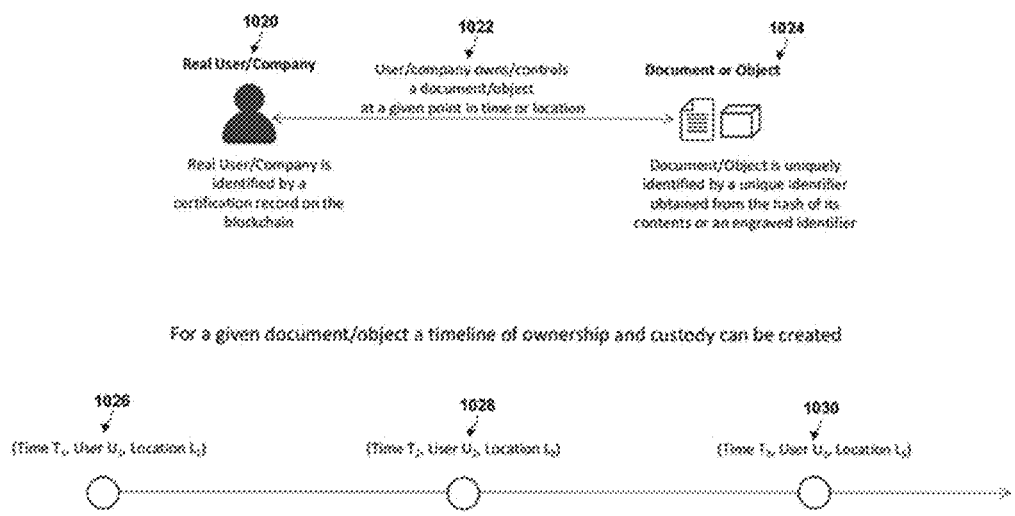
FIG. 16 is an illustration of the timeline of ownership and custody of a document or object, according to an embodiment of the invention.

Referring to FIG. 16, a timeline of ownership and custody of a document or object, according to an embodiment of the present invention is described in more detail. A document or object 1024 is owned or controlled by a user or company 1020 at a given point in time or location. By recording the ownership and custody of the document or object along with the timestamp and/or location, a timeline can be created such that points 1026, 1028, 1030 on the timeline establish the ownership and custody of the document or object.

Figure 17:
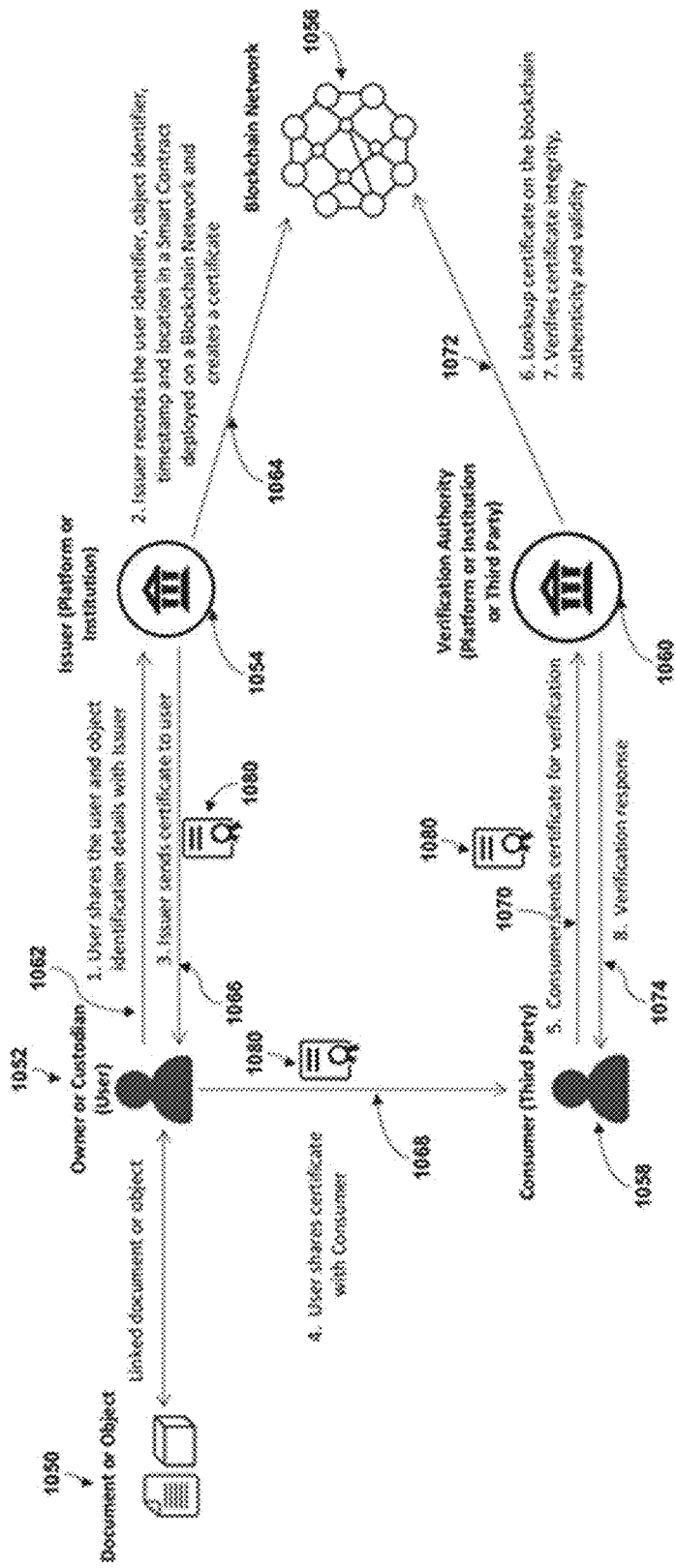
FIG. 17 is an illustration of the certificate generation process, according to an embodiment of the invention.

An embodiment of the invention provides a system and associated methods for issuing blockchain-based digital certificates which serve as combined Proofs of Existence, Ownership, Custody and Integrity of documents or objects (digital or physical), defined as a combination certificate. Referring to FIG. 17, a combination certificate generation process for a document or object, according to an embodiment of the present invention is described in more detail. The entities and systems involved in the combination certificate generation process include a user 1052 who is the owner or custodian of a document or object 1050, an issuer 1054 who issues the blockchain-based digital certificate, and a blockchain network 1056 on which the smart contracts for issuing and recording digital certificates are deployed. The combination certificate generation process begins with the user 1052 sharing the user and document/object identification details in step 1062 with the issuer 1054. The issuer 1054 records the user identifier, object identifier, timestamp and, optionally, a location of the user in a smart contract deployed on the blockchain network 1056 in step 1064, and creates a combination certificate 1080. The combination certificate 1080 is sent by the issuer 1054 to the user 1052 in step 1066. The user 1052 can share 1068 the combination certificate 1080 with a consumer or third party 1058. The consumer or third party 1058 can get the combination certificate 1080 verified from a verification authority 1060. The verification authority 1060 may be the same institution as the issuer 1054 or may be a third party. The consumer or third party 1058 sends the combination certificate 1080 for verification to the verification authority 1060 in step 1070. The verification authority 1060 looks up the combination certificate 1080 on the blockchain network 1056 and verifies the certificate integrity, authenticity and validity in step 1072. A verification response is sent back to the consumer or third party 1058 by the verification authority 1060 in step 1074.

It is contemplated and included within the scope of the invention that embodiments of the invention may be operable to interact with a blockchain network 1056 as presented herein, including, but not limited to, proof-of-work systems, proof-of-stake systems, and hybrid systems that are a combination of proof-of-work and proof-of-stake systems. Furthermore, it is contemplated and included within the scope of the invention that the invention may be operable to interact with a public ledger system other than a blockchain network.

Figure 18:
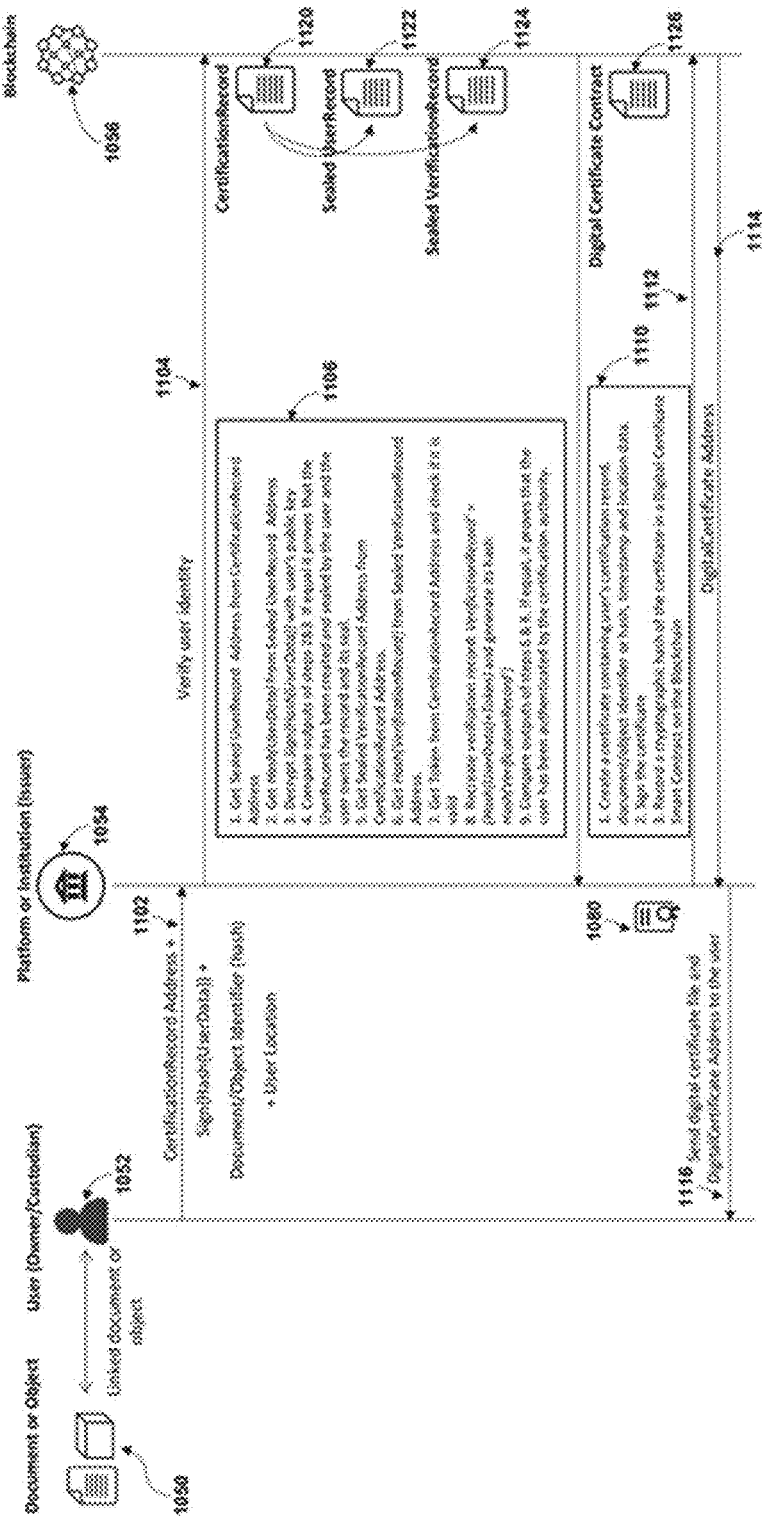
FIG. 18 is an illustration of the process for issuing a certificate for proof of existence, ownership, custody and integrity, according to an embodiment of the invention.

Referring to FIG. 18, and additionally referring to FIGS. 2 and 3, the process for issuing a combination certificate for proof of existence, ownership, custody and integrity, according to an embodiment of the present invention is described in more detail. A certified user 1052 who is the owner or custodian of a document or object 1050, sends the user's CertificationRecord address, digitally signed and hashed 'UserData', hash of the document contents or object identifier, and user location to the issuer 1054 in step 1102. The issuer 1054 then verifies the user identity in step 1104 by performing a user validation process 1106. The steps involved in the user validation process 1106 may include, as follows:

1. Get Sealed UserRecord Address 1122 from CertificationRecord Address 1120
2. Get Hash(UserData) from Sealed UserRecord Address 1122
3. Decrypt Sign(Hash(UserData)) with user's public key
4. Compare outputs of steps 2 and 3. If at least a partial match it proves that the UserRecord has been created and sealed by the user and the user own's the record and its seal.
5. Get Sealed VerificationRecord Address 1124 from CertificationRecord Address 1120
6. Get Hash(VerificationRecord) from Sealed VerificationRecord Address 1124
7. Get Token from CertificationRecord Address and check if it is valid
8. Recreate verification record: VerificationRecord'= (Hash(UserData)+Token) and generate its hash: Hash(VerificationRecord')
9. Compare outputs of steps 6 and 8. If at least a partial match, it proves that the user has been authenticated by the certification authority.

In the comparisons performed at steps 4 and 9, at least a partial match is required. The partial match may be based on satisfying one or more criteria, including, but not limited to, matching of a subset of fields in a record, longest prefix match, longest sub-string match or fields in the record satisfying a range query. In some embodiments, all the criteria must be satisfied for the comparison to be deemed successful and demonstrating, in the case of step 4, that the UserRecord has been created and sealed by the user and the user own's the record and its seal and, in the case of step 9, that the user has been authenticated by the certification authority.

The above steps complete the user validation process 1106. Next, the combination certificate is created at 1110 as follows:

1. Create a combination certificate containing user's certification record, document/object identifier or hash, timestamp and, optionally, location data.
2. Sign the combination certificate digitally
3. Record a cryptographic hash of the combination certificate in a Digital Certificate Smart Contract 1126 on the blockchain network 1056.

The issuer 1054 may receive a DigitalCertificate Address of the Digital Certificate Smart Contract 1126 on the blockchain network 1056 at step 1114. The issuer 1054 then sends the combination certificate 1080 containing the DigitalCertificate Address and other certificate details to the user 1052 in step 1116.

Figure 19:
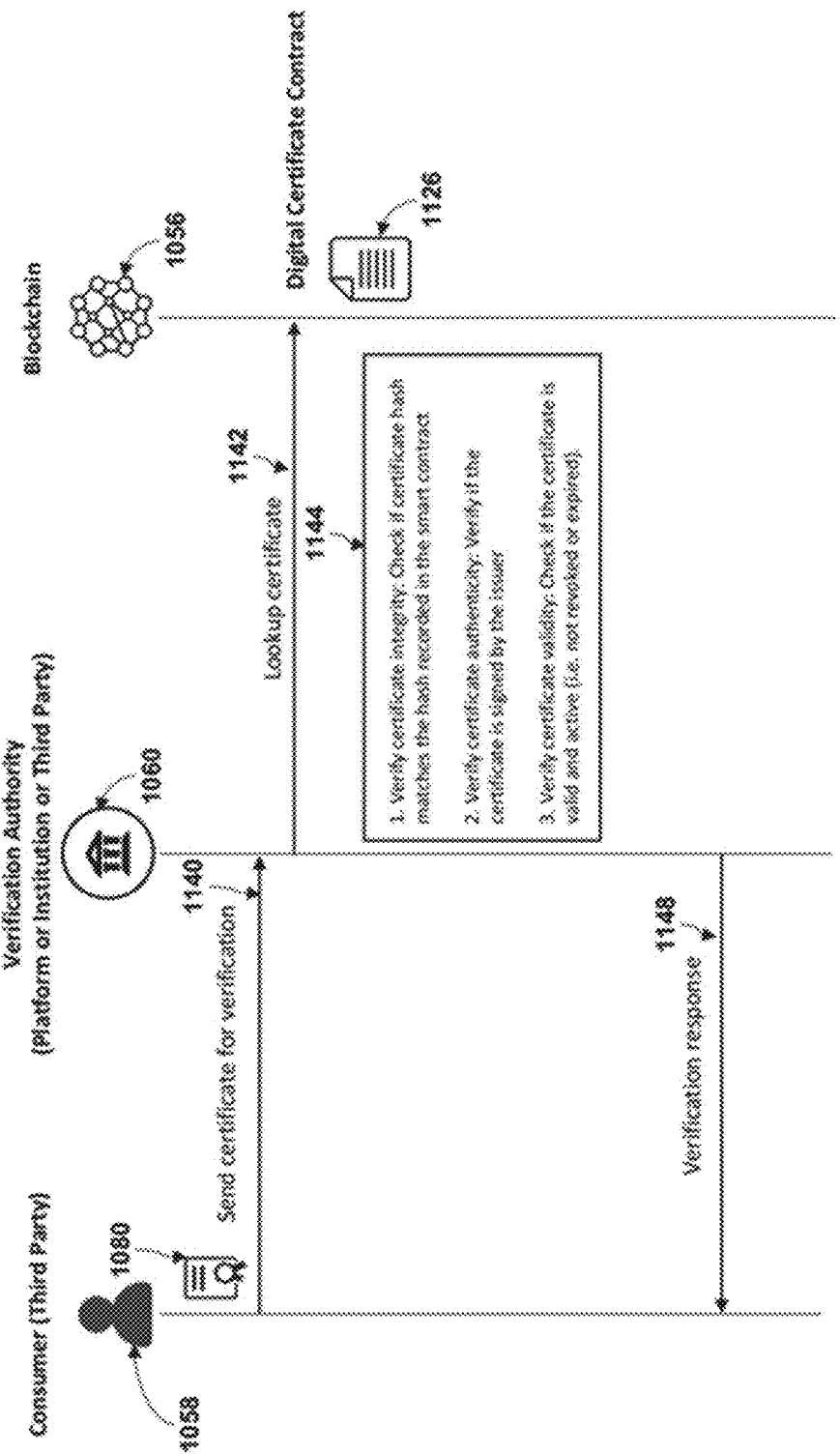
FIG. 19 is an illustration of the certificate verification process, according to an embodiment of the invention.

Referring to FIG. 19, the certificate verification process for a document or object, according to an embodiment of the present invention is described in more detail. The consumer or third party 1058 can verify a combination certificate 1080 with a verification authority 1060. The consumer or third party 1058 sends the combination certificate 1080 to the verification authority 1060 in step 1140. A mobile or web application may be used in the certificate verification process where a user can submit the combination certificate in the mobile or web application for verification. The verification authority 1060 looks up the combination certificate 1080 on the blockchain network 1056 in step 1142 and then verifies the combination certificate 1080 at 1144 as follows:

1. Verify combination certificate integrity: Check if the combination certificate hash matches the hash recorded in the smart contract.
2. Verify combination certificate authenticity: Verify if the combination certificate is signed by the issuer.
3. Verify combination certificate validity: Check if the combination certificate is valid and active (i.e. not revoked or expired).

Once the combination certificate 1080 is verified, the verification authority 1060 sends a verification response 1148 to the consumer or third party 1058.

Figure 20:
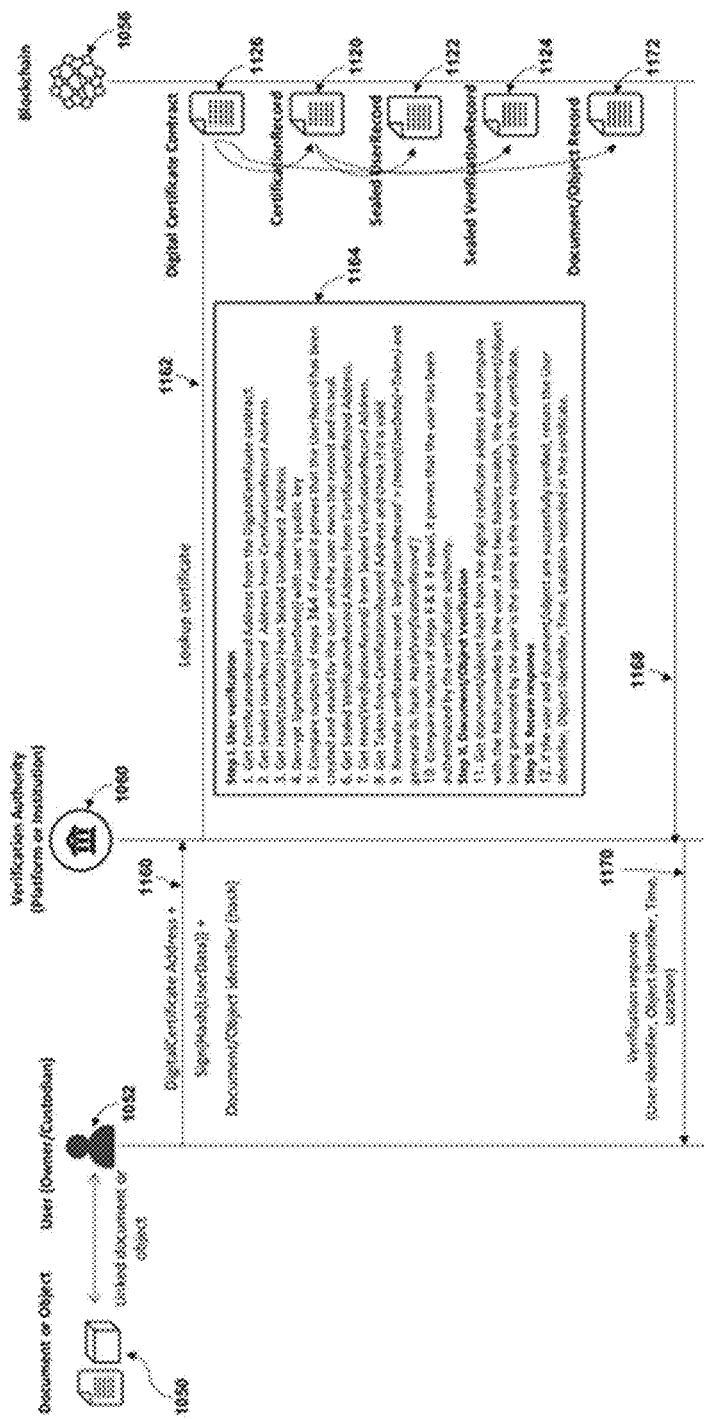
FIG. 20 is an illustration of the process for verifying or proving existence, ownership, custody and integrity of a document or object, according to an embodiment of the invention.

Referring to FIG. 20, the process for verifying or proving existence, ownership, custody and integrity of a document or object, according to an embodiment of the present invention is described in more detail. A user 1052 who is the owner or custodian of a document or object 1050, can prove the existence, ownership, custody and integrity of a document or object, by sharing the DigitalCertificate Address, digitally signed and hashed 'UserData', and the document/object identifier (hash of the document contents or the object identifier) with the verification authority 1060. The verification authority 1060 then looks up the certificate on the blockchain network 1056 and verifies the user identity and existence, ownership, custody and integrity of the document or object 1050 at 1164 as follows:

1. Get CertificationRecord Address 1120 from the DigitalCertificate Address 1126
2. Get Sealed UserRecord Address 1122 from CertificationRecord Address 1120
3. Get Hash(UserData) from Sealed UserRecord Address 1122
4. Decrypt Sign(Hash(UserData)) with user's public key
5. Compare outputs of steps 3 and 4. If at least a partial match it proves that the UserRecord has been created and sealed by the user and the user own's the record and its seal.
6. Get Sealed VerificationRecord Address 1124 from CertificationRecord Address 1120
7. Get Hash(VerificationRecord) from Sealed VerificationRecord Address 1124
8. Get Token from CertificationRecord Address and check if it is valid
9. Recreate verification record: VerificationRecord'= (Hash(UserData)+Token) and generate its hash: Hash(VerificationRecord')
10. Compare outputs of steps 7 and 9. If at least a partial match, it proves that the user has been authenticated by the certification authority.
11. Get document/object hash from the DigitalCertificate contract 1126 and compare with the hash provided by the user. If the two hashes match at least partially, the document/object being presented by the user is the same as the one recorded in the certificate.
12. If the user and document/object are successfully verified, return the User identifier, Object identifier, Time, Location recorded in the combination certificate 1126.

Figure 21:
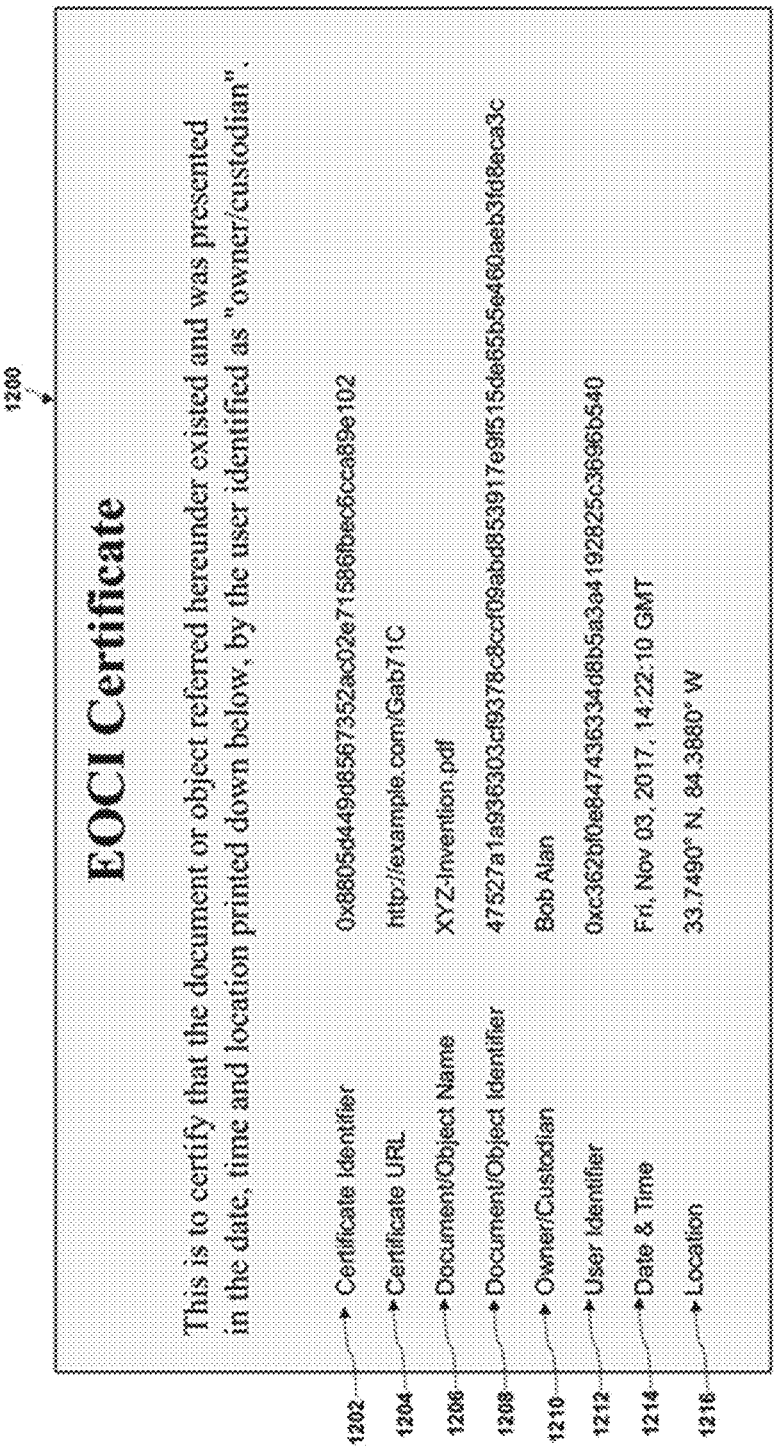
FIG. 21 is an illustration of an example of a combined proof of ownership, existence, custody and integrity certificate, according to an embodiment of the invention.

FIG. 21 is an illustration of an example of a combined proof of ownership, existence, custody and integrity certificate, according to an embodiment of the invention. The digital certificate 1200 includes a certificate identifier 1202, a certificate URL 1204 (which is specific to the issuer or the platform issuing the certificate), the document or object name 1206, the document or object identifier 1208, the name of the owner or custodian 1210 of the document or object, the user (owner or custodian) identifier 1212, date and time of generation of the certificate 1214 and location of the user when the certificate was issued 1216.

Figure 22:
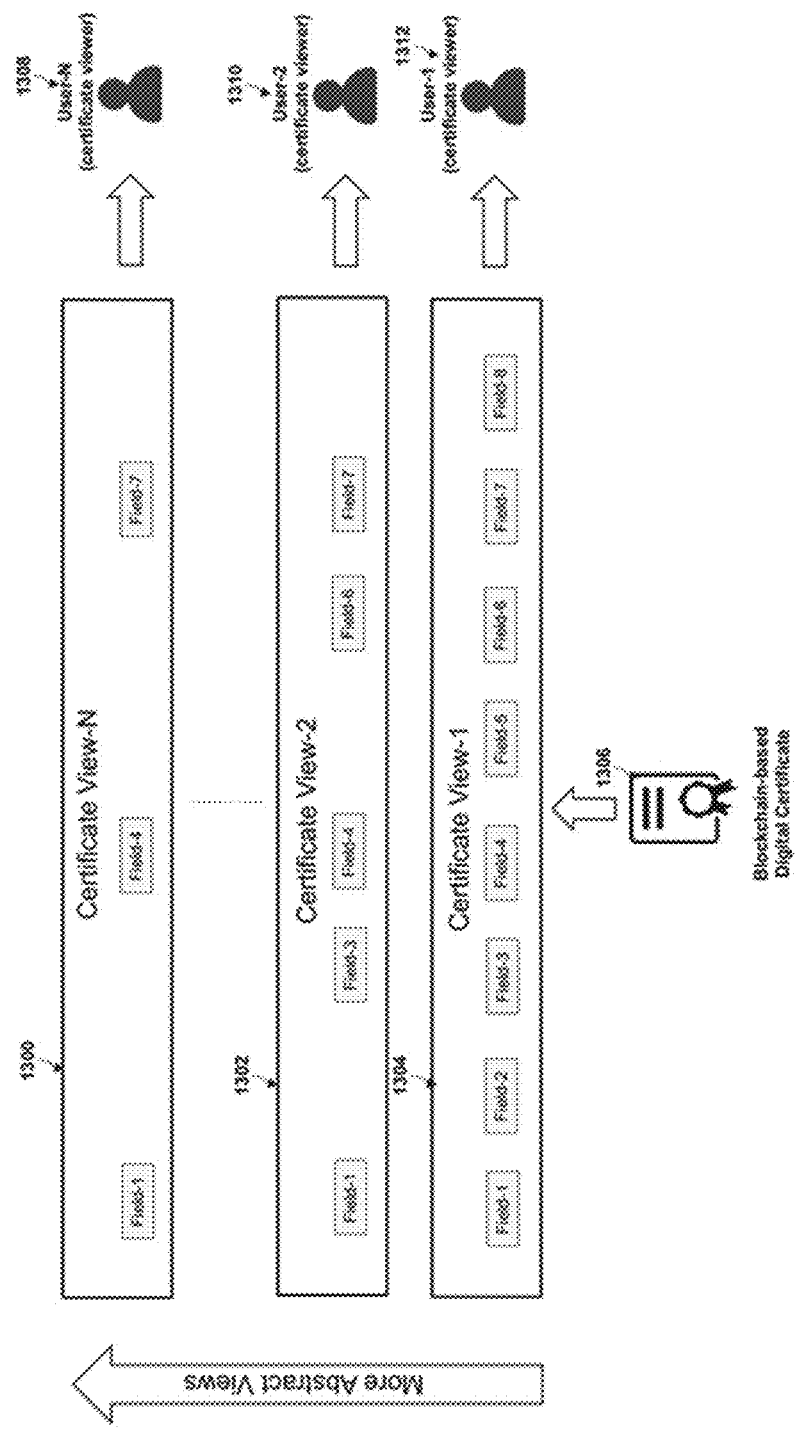
FIG. 22 is an illustration of levels of abstraction for a combined proof of ownership, existence, custody and integrity certificate, according to an embodiment of the invention.

Referring to FIG. 22, levels of abstraction for a combined proof of ownership, existence, custody and integrity certificate, according to an embodiment of the invention, are described in more detail. A combination certificate may take many forms when generated for different purposes or views (such as full, partial or redacted) depending on privacy and security constraints. A combination certificate record 1306 may have multiple levels of abstraction and detail depending on how and who is viewing or verifying it. For example, in the case of a combination certificate that represents the academic credentials of a student, a potential employer can see some details on the GPA of a graduate student but not how long it took to graduate, whereas, a graduate school could see the reference letters or list of courses and individual grades. Similarly, in the case of a combination certificate that represents the ownership and transfer record of a house, one level of detail can be shown to a buyer and another level of detail can be shown to a lender. In the least abstract form, a certificate view 1304 may make all the combination certificate fields visible to a user 1312. Whereas in the most abstract form 1300, only a subset of fields in the combination certificate may be visible to the user 1308. Furthermore, an intermediate abstract form 1302 may include a subset of fields that varies in scope in terms of the quantity and content of the fields presented by either the most abstract form 1300 and the certificate view 1304. A combination certificate could provide links to other certificates with further related information and access roles and permissions required to access those links. A combination certificate may also contain a chain of custody and a timeline. In some embodiments, a consumer or third party 1058 can verify an intermediate abstract form of a combination certificate 1080 with a verification authority 1060. In such a case the consumer can send a loose query (for example, "has the student graduated before 2004?", "is a student's GPA above 3.0?", "is an asset owned is valued above $2M?"). The verification authority or a server employed by the verification authority then interprets the queries and translates such loose queries into elaborate lower level queries resulting in partial or exact matches. This ability to interpret user queries or verification requests from a subset of fields in a combination certificate and translating such loose, high level or abstract queries into precise, elaborate and lower level queries makes it easier to verify certain certificates without requiring precise information or queries.

Figure 23:
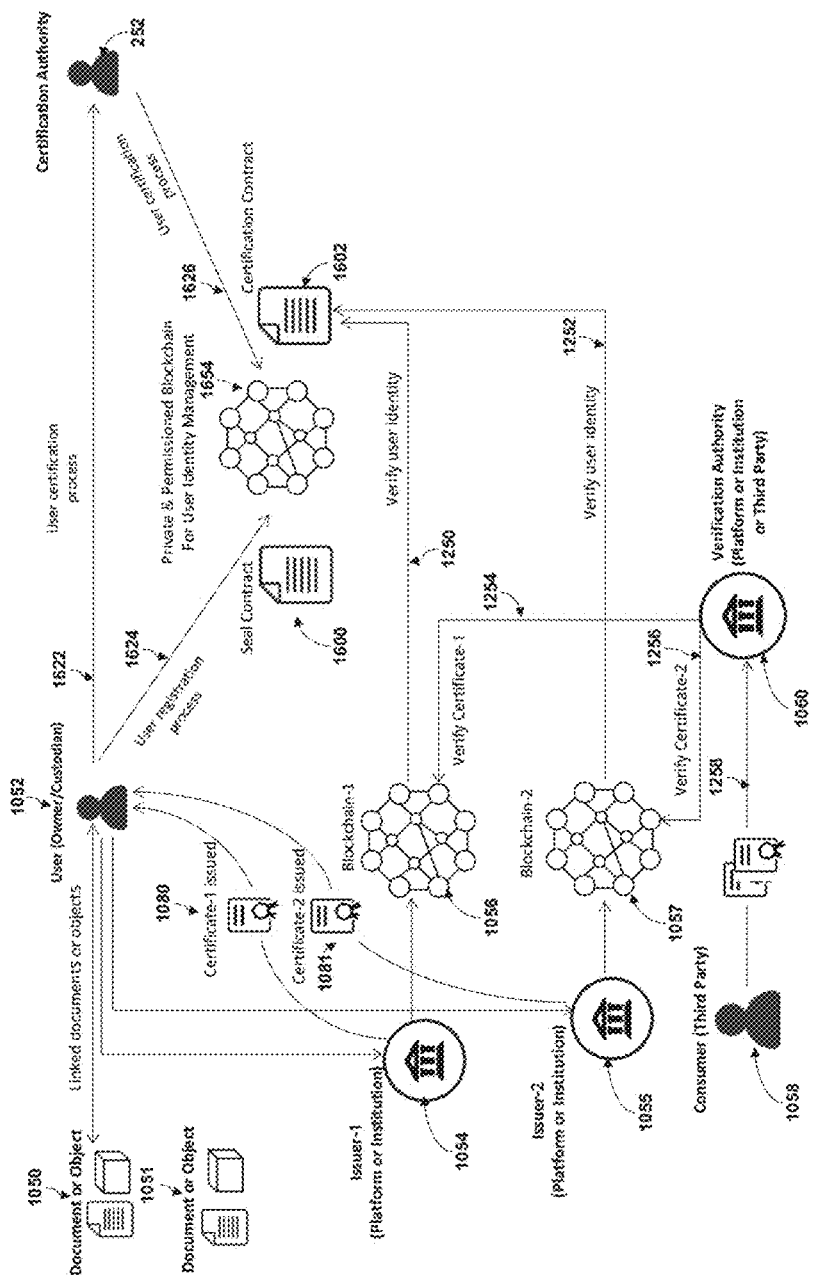
FIG. 23 is an illustration of the process for issuing and verifying certificates for multiple documents or objects on multiple blockchains linked to the same user, according to an embodiment of the invention.

Referring to FIG. 23, and additionally referring to FIGS. 9 and 10, the process for issuing and verifying certificates for multiple documents or objects on multiple blockchains linked to the same user, according to an embodiment of the present invention is described in more detail. The user registration process 1624 needs to be done only once for a user 1052, generating a seal contract 1600. Similarly, the certification process 1622/1624 is done once for the user generating a certification contract 1602. The seal and certification contracts 1600, 1602 are deployed on a blockchain network 1654. The user 1052 is the owner or custodian of a documents or objects 1050 and 1051 for which combination certificates 1080 and 1081, as described above and shown in FIG. 17, are issued by separate issuers 1054 and 1055 on separate blockchain networks 1056 and 1057 respectively. While issuing the certificate for documents/objects 1050 and 1051, the respective issuers 1054 and 1055 verify the user identity from the certification contract 1602 deployed on the blockchain network 1654. The user 1052 can maintain the same identity across multiple blockchain networks (such as 1056 and 1057) for getting the digital certificates for multiple documents/objects (such as 1050 and 1051) without going through the user registration and certification process again. The user 1052 can share the combination certificates 1080 and 1081 with a consumer or third party 1058. The consumer or third party 1058 can get the combination certificates 1080 and 1081 verified from the verification authority 1060. To verify a certificate, the verification authority looks up the certificate on the corresponding blockchain network and then performs the verification steps described hereinabove.

Figure 24:
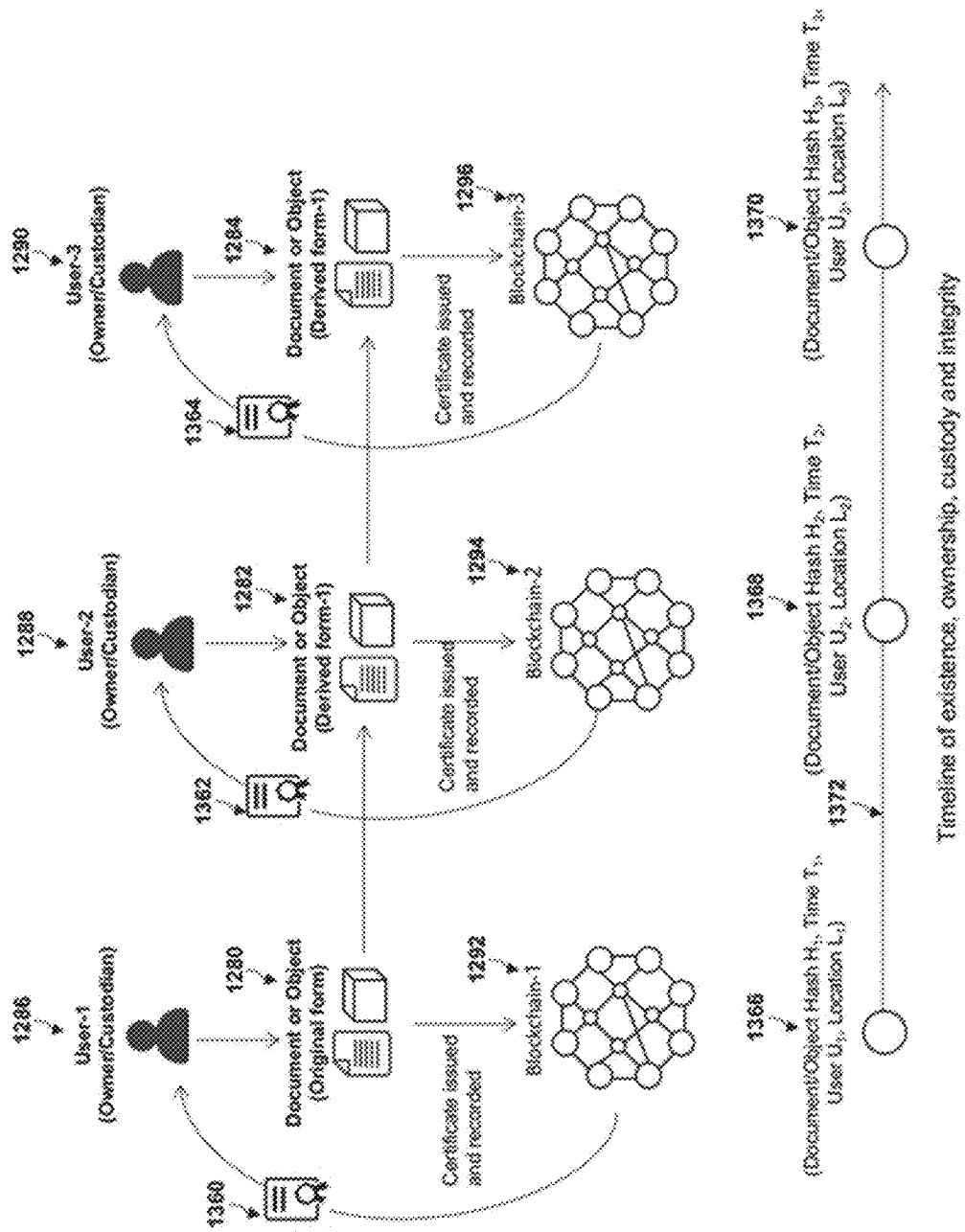
FIG. 24 is an illustration a sequential model of document/object existence where the derived forms of a document/object are recorded on multiple blockchains, according to an embodiment of the invention.

FIG. 24 is an illustration of a sequential model of document/object existence where the derived forms of a document/object are recorded on multiple blockchains, according to an embodiment of the invention. A document or object 1280 can be processed, edited or modified to create multiple derived objects 1282 and 1284 which exist sequentially (as in the case of Diamonds). The combined existence, ownership, custody and integrity of a document or object 1280 is recorded in a combination certificate 1360 on a blockchain network 1292 and owned by a first user 1286. Similarly, the derived objects can be processed/recorded as subsequent second and third combination certificates 1362, 1364 in a successive sequence of second and third blockchain networks 1294 and 1296, sequentially, and owned by successive second and third users 1286, 1290, respectively. In the sequential case, the document/object gets transformed into another document/object and recorded on the next blockchain but is not present in the previous one. The sequential model is a lifetime trajectory where an object can pass through (or get recorded in) multiple blockchains but is active in only one, and leaves a trail. A timeline of existence, ownership, custody and integrity 1372 can be established for an object 1280 where each point in the timeline 1366, 1368, 1370 corresponds to the original or derived forms of a document/object and is associated with each of the first, second, and third blockchain networks 1292, 1294, 1296 as well as the first, second, and third users 1286, 1288, 1290.

Figure 25:
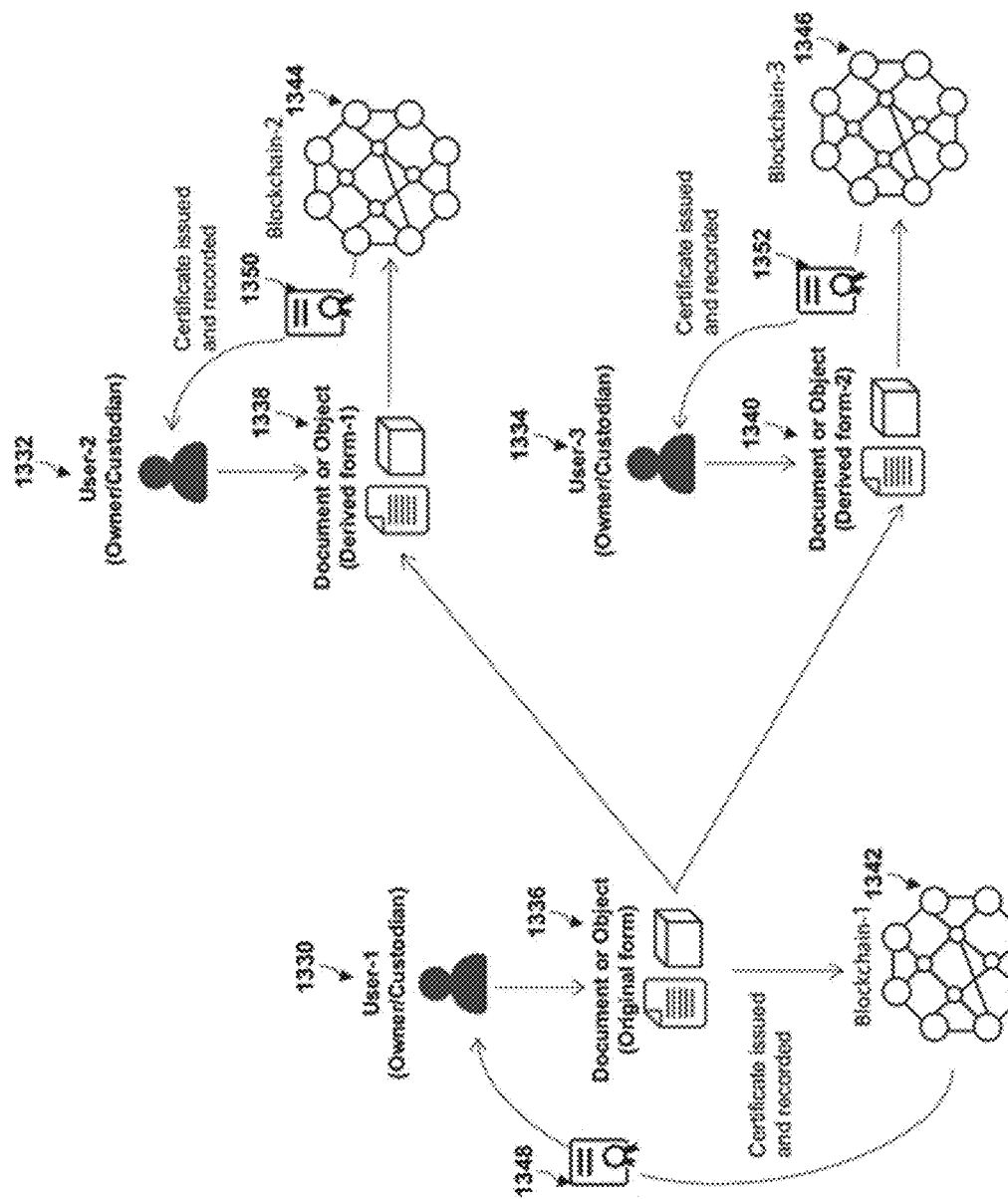
FIG. 25 is an illustration a concurrent model of document/object existence where the derived forms of a document/object are recorded on multiple blockchains, according to an embodiment of the invention.

FIG. 25 is an illustration of a concurrent model of document/object existence where the derived forms of a document/object are recorded on multiple blockchains, according to an embodiment of the invention. A document or object 1336 can be processed, edited or modified to create multiple derived objects 1338 and 1340 which exist concurrently (as in prescription and retail and payment blockchains). The combined existence, ownership, custody and integrity of a document or object 1336 is recorded in a combination certificate 1348 on a blockchain network 1342 and owned by a first user 1330. Similarly, the derived objects can be processed/recorded in second and third combination certificates 1350, 1352 in a successive sequence of blockchain networks 1334, 1346, concurrently, and owned by second and third users 1332, 1334, respectively. In the concurrent model the document/object can exist in derived forms in multiple chains.

Some of the illustrative aspects of the present invention may be advantageous in solving the problems herein described and other problems not discussed which are discoverable by a skilled artisan.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A method of issuing blockchain-based digital certificates comprising:
    receiving from a user hashed user identification information and object information;
    recording to a digital certificate smart contract deployed at a digital certificate smart contract address on a blockchain network the hashed user identification information and object information and a timestamp of when the hashed user identification information and the object information were received, defined as a received timestamp;
    signing the digital certificate smart contract with an issuer signature;
    performing a user identity verification process to confirm a user identity;
    upon confirming the user identity, generating a combination certificate configured to be shared by the user to verify the user's ownership of an object associated with the object information;
    sending the combination certificate to the user;
    receiving a combination certificate from a consumer, defining a received combination certificate;
    generating a received combination certificate hash value by applying a hash function to the received combination certificate;
    recording the received combination certificate hash value to the digital certificate smart contract;
    performing a combination certificate verification process on the received ownership certification to verify the received combination certificate, the combination certificate verification process comprising:
        identifying a signature of the received combination certificate;
        obtaining a received digital certificate smart contract address from the received combination certificate;
        generating a query hash value by applying a hash function to the received combination certificate;
        looking up the combination certificate on the digital certificate smart contract at the digital certificate smart contract address;
        verifying the query hash value matches the received combination certificate hash value comprised by the digital certificate smart contract;
        verifying the signature of the combination certificate matches the issuer signature of the digital certificate smart contract; and
        verifying the combination certificate is valid and active; and
    upon verifying the received combination certificate, sending a confirmation verification response to the consumer.

2. The method of claim 1 wherein the object information is derived from a digital object comprising content; and wherein the object information comprises a unique identifier generated by applying a cryptographic hash function to the content of the digital object.

3. The method of claim 1 wherein the object information is derived from a physical object comprising an object identifier; and wherein the object information comprise a unique identifier generated by applying a cryptographic hash to the object identifier of the physical object.

4. The method of claim 1 further comprising:
receiving from the user a digital certificate smart contract address, hashed user identification information signed by a private key of the user, and hashed object information;
obtaining a user certification record address from a digital certificate smart contract at the digital certificate smart contract address;
obtaining a sealed user record address, a sealed verification record address, and a token from a user certification record at the user certification record address;
retrieving hashed user identification information, defined as retrieved user identification information, from a sealed user record at the sealed user record address;
decrypting the received user identification information using the user's public key, defining decrypted user identification information;
comparing the decrypted user identification information with the retrieved user identification information;
retrieving a hashed verification record from a sealed verification record at the sealed verification record address;
determining if the token from the user certification record address is valid;
generating a generated verification record comprising the retrieved user identification information and the token;
generating a hashed generated verification record by applying a hash function to the generated verification record; and
comparing the hashed generated verification record to the hashed verification record;
retrieving object information, defining retrieved object information, from the digital certificate at the digital certificate address;
comparing the retrieved object information with the hashed object information;
retrieving from the digital certificate smart contract a timestamp, defining a retrieved timestamp; and
upon determining the decrypted user identification information with the retrieved user identification information are at least a partial match, the hashed generated verification record to the hashed verification record are at least a partial match, and the retrieved object information and the hashed object information are at least a partial match, sending to the user the retrieved user identification information, the retrieved object information, and the retrieved timestamp.

5. The method of claim 1 wherein performing a user validation process comprises:
receiving from the user a user certification record address, hashed user identification information that has been signed with a private key of the user defined as received user identification information, hashed object information defined as received object information, and a user public key;
obtaining each of a sealed user record address, a sealed verification record address, and a token from a user certification record address at the user certification record address;
retrieving hashed user identification information from a sealed user record at the sealed user record address, defining retrieved user identification information;
decrypting the received user identification information using the user public key, defining decrypted user identification information;
comparing the decrypted user identification information with the retrieved user identification information;
retrieving a hashed verification record from a sealed verification record at the sealed verification record address, defining a retrieved verification record;
determining if the token from the user certification record address is valid;
upon determining the token from the user certification record address is valid, generating a generated verification record comprising the retrieved user identification information and the token;
generating a hashed verification record by applying a hash function to the generated verification record;
comparing the hashed verification record with the retrieved verification record; and
confirming the user identity by determining the decrypted user identification information and the retrieved user identification information are at least a partial match and the hashed verification record and the retrieved verification record are at least a partial match.

6. The method of claim 5 wherein generating the combination certificate comprises:
generating the combination certificate comprising the user's certification record address, the received object information, and the received timestamp;
generating a combination certificate hash value from a hash function including the combination certificate as an input;
encrypting the combination certificate hash value with an issuer private key, defining an issuer signature;
signing the combination certificate with the issuer signature, defining a signed combination certificate; and
recording the signed combination certificate to the digital certificate smart contract.

7. The method of claim 1 further comprising:
receiving hashed second user identification information associated with a second user and a derivative of the object information, defining a derivative object information;
recording to a second digital certificate smart contract deployed at a second digital certificate smart contract address on a second blockchain network the hashed second user identification information and the derivative object information and a timestamp of when the hashed second user identification information and the derivative object information were received, defined as a second received timestamp;
signing the second digital certificate smart contract with a second issuer signature;
generating a second combination certificate configured to be shared by the second user to verify the second user's ownership of a derivative object associated with the derivative object information; and
sending the second combination certificate to the second user.

8. The method of claim 7 wherein the object information is derived from a digital object comprising content; wherein the derivative object is a digital object comprising a subset of the content of the digital object from which the digital object is derived; and wherein the derivative object information comprises a unique identifier generated by applying a cryptographic hash function to the derivative object.

9. The method of claim 7 further comprising:
receiving hashed third user identification information associated with a third user and the derivative object information;
recording to a third digital certificate smart contract deployed at a third digital certificate smart contract address on a third blockchain network the hashed third user identification information and the derivative object information and a timestamp of when the hashed third user identification information and the derivative object information were received, defined as a third received timestamp;

signing the third digital certificate smart contract with a third issuer signature;

generating a third combination certificate configured to be shared by the third user to verify the third user's ownership of a derivative object associated with the derivative object information;

sending the third combination certificate to the third user; and recording to the second digital certificate smart contract an indication that the second digital certificate smart contract is expired.

10. The method of claim 7 further comprising:

receiving hashed third user identification information associated with a third user and a second derivative of the object information, defining a second derivative object information;

recording to a third digital certificate smart contract deployed at a third digital certificate smart contract address on a third blockchain network the hashed third user identification information and the second derivative object information and a timestamp of when the hashed third user identification information and the second derivative object information were received, defined as a third received timestamp;

signing the third digital certificate smart contract with a third issuer signature;

generating a third combination certificate configured to be shared by the third user to verify the third user's ownership of a derivative object associated with the second derivative object information; and sending the third combination certificate to the third user;

wherein the second derivative object information exists concurrently with the derivative object information.

11. The method of claim 1 further comprising:

generating a secondary combination certificate configured to be shared by the user to verify the user's ownership of a subset of information object associated with the object information; and sending the secondary combination certificate to a second user.

12. The method of claim 11 further comprising:

receiving a secondary combination certificate from a consumer, defining a received combination certificate;

performing a combination certificate verification process on the received ownership certification to verify the received combination certificate;

upon verifying the received combination certificate, sending a confirmation verification response to the consumer; and sending a subset of information comprised by the object information to the consumer.

13. The method of claim 1 further comprising recording to the digital certificate smart contract a location of the user when the user identification information and the object information were received.

14. The method of claim 1 wherein the blockchain network supports at least one decentralized consensus protocols of proof-of-work proof-of-stake, proof-of-activity, proof-of-burn, proof-of-capacity, and proof-of-elapsed time.

15. A method of issuing blockchain-based digital certificates comprising:

receiving from a user a user certification record address, hashed user identification information that has been signed with a private key of the user defined as received user identification information, hashed object information defined as received object information, and a user public key;

recording to a digital certificate smart contract deployed at a digital certificate smart contract address on a blockchain network the received user identification information and the received object information and a timestamp of when the received user identification information and the received object information were received, defined as a received timestamp;

signing the digital certificate smart contract with an issuer signature;

performing a user validation process comprising:

obtaining each of a sealed user record address, a sealed verification record address, and a token from a user certification record address at the user certification record address;

retrieving hashed user identification information from a sealed user record at the sealed user record address, defining retrieved user identification information;

decrypting the received user identification information using the user public key, defining decrypted user identification information;

comparing the decrypted user identification information with the retrieved user identification information;

retrieving a hashed verification record from a sealed verification record at the sealed verification record address, defining a retrieved verification record;

determining if the token from the user certification record address is valid;

upon determining the token from the user certification record address is valid, generating a generated verification record comprising the retrieved user identification information and the token;

generating a hashed verification record by applying a hash function to the generated verification record;

comparing the hashed verification record with the retrieved verification record; and confirming a user identity by determining the decrypted user identification information and the retrieved user identification information are at least a partial match and the hashed verification record and the retrieved verification record are at least a partial match;

upon confirming the user identity, generating a combination certificate comprising the user's certification record address, the object information, and the timestamp, configured to be shared by the user to verify the user's ownership of an object associated with the object information;

generating a combination certificate hash value from a hash function including the combination certificate as an input;

encrypting the combination certificate hash value with an issuer private key, defining an issuer signature;

signing the combination certificate with the issuer signature, defining a signed combination certificate;

recording the signed combination certificate to the digital certificate smart contract; and sending the combination certificate to the user.

16. The method of claim 15 further comprising:
receiving hashed second user identification information associated with a second user and a derivative of the object information, defining a derivative object information;
recording to a second digital certificate smart contract deployed at a second digital certificate smart contract address on a second blockchain network the hashed second user identification information and the derivative object information and a timestamp of when the hashed second user identification information and the derivative object information were received, defined as a second received timestamp;
signing the second digital certificate smart contract with a second issuer signature;
generating a second combination certificate configured to be shared by the second user to verify the second user's ownership of a derivative object associated with the derivative object information; and
sending the second combination certificate to the second user.

17. The method of claim 16 further comprising:
receiving hashed third user identification information associated with a third user and the derivative object information;
recording to a third digital certificate smart contract deployed at a third digital certificate smart contract address on a third blockchain network the hashed third user identification information and the derivative object information and a timestamp of when the hashed third user identification information and the derivative object information were received, defined as a third received timestamp;
signing the third digital certificate smart contract with a third issuer signature;
generating a third combination certificate configured to be shared by the third user to verify the third user's ownership of a derivative object associated with the derivative object information;
recording to the second digital certificate smart contract an indication that the second digital certificate smart contract is expired; and
sending the third combination certificate to the third user.

18. The method of claim 16 further comprising:
receiving hashed third user identification information associated with a third user and a second derivative of the object information, defining a second derivative object information;
recording to a third digital certificate smart contract deployed at a third digital certificate smart contract address on a third blockchain network the hashed third user identification information and the second derivative object information and a timestamp of when the hashed third user identification information and the second derivative object information were received, defined as a third received timestamp;
signing the third digital certificate smart contract with a third issuer signature;
generating a third combination certificate configured to be shared by the third user to verify the third user's ownership of a derivative object associated with the second derivative object information; and
sending the third combination certificate to the third user;
wherein the second derivative object information exists concurrently with the derivative object information.

19. A system for issuing blockchain-based digital certificates comprising:

a processor;
a data store positioned in communication with the processor; and
a network communication device positioned in communication with each of the processor, the data store, and a network;
wherein the network communication device is operable to receive from a user hashed user identification information, object information, and a user public key;
wherein the processor is operable to record to a digital certificate smart contract deployed at a digital certificate smart contract address on a blockchain network the hashed user identification information and object information and a timestamp of when the hashed user identification information and the object information were received, defined as a received timestamp;
wherein the processor is operable to sign the digital certificate smart contract with an issuer signature;
wherein the system is operable to perform a user identity verification process to confirm a user identity, comprising:
   the network communication device obtaining each of a sealed user record address, a sealed verification record address, and a token from a user certification record address at the user certification record address;
   the network communication device retrieving hashed user identification information from a sealed user record at the sealed user record address, defining retrieved user identification information;
   the processor decrypting the received user identification information using the user public key, defining decrypted user identification information;
   the processor comparing the decrypted user identification information with the retrieved user identification information;
   the network communication device retrieving a hashed verification record from a sealed verification record at the sealed verification record address, defining a retrieved verification record;
   the processor determining if the token from the user certification record address is valid;
   upon determining the token from the user certification record address is valid, the processor generating a generated verification record comprising the retrieved user identification information and the token;
   the processor generating a hashed verification record by applying a hash function to the generated verification record;
   the processor comparing the hashed verification record with the retrieved verification record; and
   the processor confirming a user identity by determining the decrypted user identification information and the retrieved user identification information are at least a partial match and the hashed verification record and the retrieved verification record are at least a partial match;
wherein the processor is operable to, upon the user identity being confirmed, generate a combination certificate configured to be shared by the user to verify the user's ownership of an object associated with the object information; and
wherein the network communication device is operable to send the combination certificate to the user.

* * * * *